(12) United States Patent
Yumiki et al.

(10) Patent No.: US 8,326,137 B2
(45) Date of Patent: Dec. 4, 2012

(54) LENS BARREL AND IMAGING DEVICE PROVIDED WITH LENS BARREL, AND ASSEMBLY METHOD OF LENS BARREL

(75) Inventors: Naoto Yumiki, Osaka (JP); Takushi Terasaka, Osaka (JP); Toshio Yoshimatu, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/728,770

(22) Filed: Mar. 22, 2010

(65) Prior Publication Data

US 2010/0214672 A1    Aug. 26, 2010

Related U.S. Application Data

(62) Division of application No. 10/587,575, filed as application No. PCT/JP2005/001006 on Jan. 26, 2005, now Pat. No. 7,720,370.

(30) Foreign Application Priority Data

Jan. 30, 2004  (JP) ................................ 2004-024375
Jan. 30, 2004  (JP) ................................ 2004-024376

(51) Int. Cl.
   *G03B 17/00*   (2006.01)
(52) U.S. Cl. ........................... 396/79; 396/103; 359/825
(58) Field of Classification Search .................... 396/79, 396/82, 146, 103; 359/825
   See application file for complete search history.

(Continued)

(56) References Cited

U.S. PATENT DOCUMENTS 3,868,713 A * 2/1975 Schwarz et al. ............. 396/460
4,168,116 A    9/1979 Goldberg
4,352,543 A * 10/1982 Furusawa et al. ............ 359/830

FOREIGN PATENT DOCUMENTS

JP           62-184421           8/1987
(Continued)

OTHER PUBLICATIONS

Machine translation of JP 2003-185909A.*

(Continued)

*Primary Examiner* — Rochelle-Ann J Blackman
*Assistant Examiner* — Linda B Smith
(74) *Attorney, Agent, or Firm* — McDermott Will & Emery LLP

(57) ABSTRACT

It is an object of the present invention to provide a lens barrel in which operability for a user is increased and a reduction in parts is achieved while provided with a manual operating member. There is provided the lens barrel that is provided with an imaging optical system for forming an optical image of an object, a focus lens unit which is included in the imaging optical system and capable of changing an object distance by moving in a direction parallel to an optical axis of the imaging optical system, moving means for moving the focus lens unit in the direction parallel to the optical axis, driving means for driving the moving means, a focus ring which is of a cylindrical shape coaxial to the optical axis of the imaging optical system and manually operated in a rotational manner in order to drive the driving means to thereby move the focus lens unit by the moving means, and a focus mode switching button which is integrally provided in the focus, and operated in order to switch between a state of allowing a manual rotating operation of the focus ring and a state of preventing the manual rotating operation.

14 Claims, 24 Drawing Sheets

U.S. PATENT DOCUMENTS

| | | | |
|---|---|---|---|
| 4,629,305 A | 12/1986 | Sato et al. | |
| 4,633,072 A | 12/1986 | Sugiura et al. | |
| 5,051,767 A | 9/1991 | Honma et al. | |
| 5,621,495 A | 4/1997 | Yamamoto et al. | |
| 5,701,209 A | 12/1997 | Yoshibe et al. | |
| 5,731,919 A * | 3/1998 | Yamamoto | 359/824 |
| 5,771,411 A | 6/1998 | Iwasaki | |
| 6,240,256 B1 * | 5/2001 | Hozumi et al. | 396/223 |
| 6,700,615 B1 | 3/2004 | Satoh | |
| 6,738,198 B2 * | 5/2004 | Kashiwaba et al. | 359/704 |
| 6,973,262 B2 | 12/2005 | Matsuo | |
| 7,031,081 B2 * | 4/2006 | Petroff | 359/819 |
| 7,542,078 B2 | 6/2009 | Okusa | |
| 2001/0010557 A1 * | 8/2001 | Iiizumi et al. | 348/345 |
| 2001/0043279 A1 * | 11/2001 | Niikawa et al. | 348/335 |
| 2003/0011675 A1 * | 1/2003 | Ishibe et al. | 348/102 |
| 2003/0063212 A1 * | 4/2003 | Watanabe et al. | 348/349 |
| 2004/0081442 A1 * | 4/2004 | Suzuki | 396/89 |
| 2005/0168836 A1 * | 8/2005 | Koyama et al. | 359/699 |
| 2006/0158745 A1 * | 7/2006 | Nakamura | 359/704 |
| 2007/0115566 A1 * | 5/2007 | Miyazawa et al. | 359/811 |
| 2010/0309462 A1 * | 12/2010 | Thomas | 356/247 |

FOREIGN PATENT DOCUMENTS

| | | |
|---|---|---|
| JP | 01-304409 | 12/1989 |
| JP | 6-69923 | 9/1994 |
| JP | 7-311398 | 11/1995 |
| JP | 08-286252 A | 11/1996 |
| JP | 09-145986 A | 6/1997 |
| JP | 11-006947 | 1/1999 |
| JP | 2001-197358 | 7/2001 |
| JP | 2001-337359 | 12/2001 |
| JP | 2002-207154 | 7/2002 |
| JP | 2003-029131 | 1/2003 |
| JP | 2003-084183 | 3/2003 |
| JP | 2003-185909 | 7/2003 |
| JP | 2003185909 A * | 7/2003 |
| JP | 2003-242163 | 8/2003 |
| JP | 2003-344750 | 12/2003 |

OTHER PUBLICATIONS

Machine translation of JP2001-324660A, Takahashi et al., "Focus ring attaching structure for optical equipment", Nov. 22, 2001.*

Japanese Notice of Reasons for Rejection issued in Japanese Patent Application No. JP 2004-024375 dated Oct. 20, 2010.

Japanese Notice of Reasons for Rejection issued in Japanese Patent Application No. JP 2004-024375 dated Dec. 24, 2009.

Japanese Notice of Reasons for Rejection issued in Japanese Patent Application No. JP 2004-024375 dated May 25 2010.

Japanese Decision of Final Rejection issued in Japanese Patent Application No. JP 2004-024375 dated Jan. 20, 2011.

Japanese Decision to Dismiss an Amendment issued in Japanese Patent Application No. JP 2004-024375 dated Jan. 20, 2011.

* cited by examiner

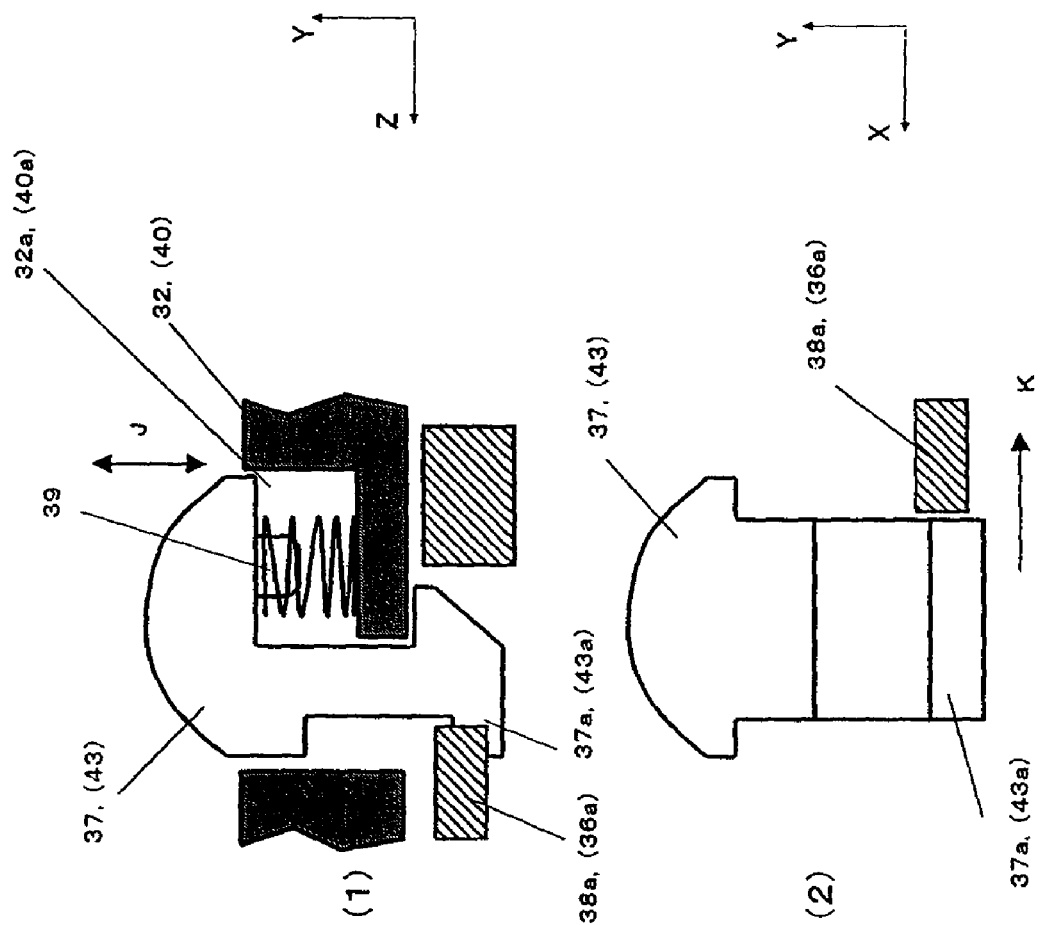

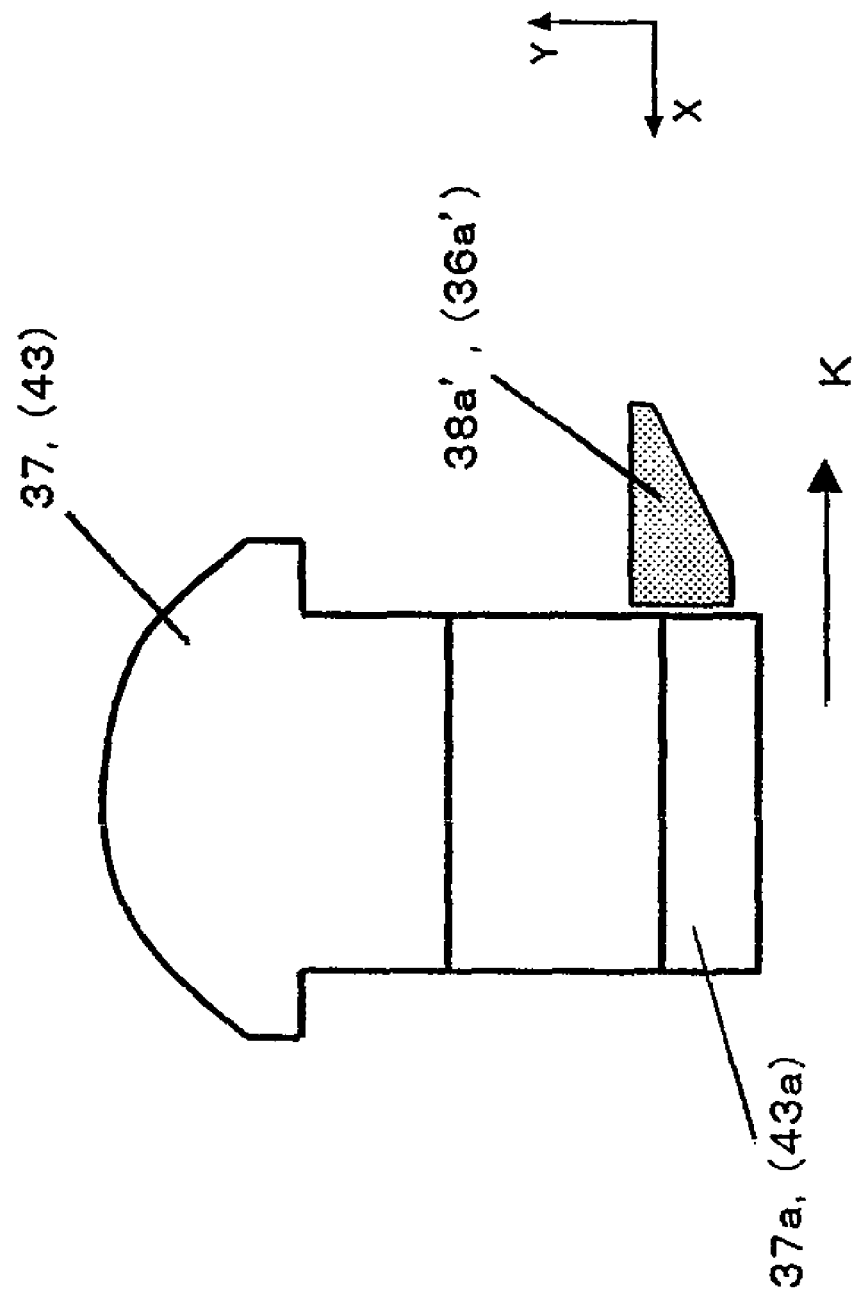

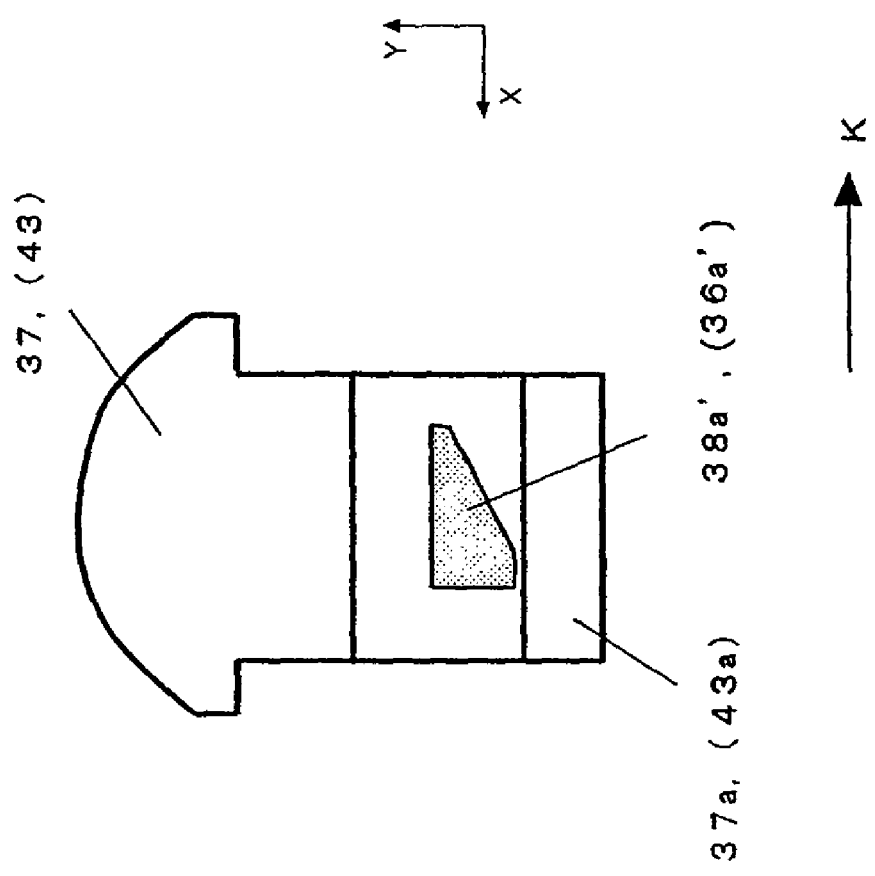

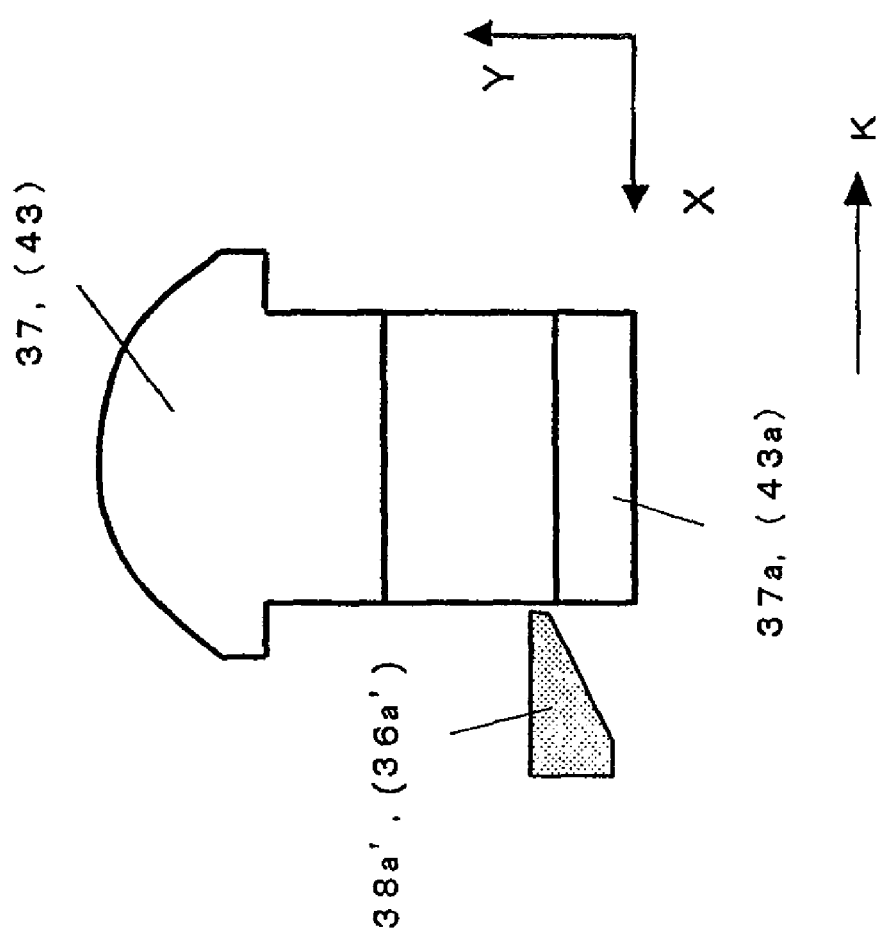

LENS BARREL AND IMAGING DEVICE PROVIDED WITH LENS BARREL, AND ASSEMBLY METHOD OF LENS BARREL

RELATED APPLICATION

This application is a Divisional of U.S. patent application Ser. No. 10/587,575, filed on Jul. 31, 2006 now U.S. Pat. No. 7,720,370, which is a U.S. National Phase of PCT/JP2005/001006, filed on Jan. 26, 2005, claiming priority of Japanese Application Nos. 2004-024375 and 2004-024376 both of which were filed on Jan. 30, 2004, the entire contents of each of which are hereby incorporated by reference.

TECHNICAL FIELD

The present invention relates to a lens barrel, an imaging device provided with the lens barrel, a camera provided with the imaging device, and an assembly method of the lens barrel, and relates more specifically to a lens barrel provided with a manual operating member and an imaging device provided with the lens barrel, and an assembly method of the lens barrel.

BACKGROUND ART

In recent years, a digital still camera and a digital video camera (hereinafter, referred merely to as digital camera) capable of converting an optical image of an object into an electrical image signal to be outputted therefrom have rapidly come into widespread use.

The digital cameras are roughly classified into two groups: namely, one is a full auto model aiming at an improvement in speed of auto focus, a reduction in size and weight of a main body, or the like; and the other is a high-end model provided with a focus ring for performing a manual operation of focusing and an aperture ring for performing a manual operation of exposure setting. Recently, since quality of images taken by the digital camera has been improved, popularity of the high-end model which can provide users with satisfaction to operate by themselves has also been increased.

The digital camera includes an imaging device provided with an image sensor, such as a CCD (Charge Coupled Device) or the like. The imaging device has a lens barrel for holding an imaging optical system. The lens barrel for use in a digital camera which can be manually operated is usually provided with operating members, such as cylindrical zoom ring, focus ring, aperture ring, and the like. There is disclosed in, for example, Patent Document 1, a camera provided with a lens barrel provided with a zoom ring, a focus ring, and an aperture ring, which can be manually operated. The camera described in Patent Document 1 can perform zooming by operating the zoom ring, focusing by operating the focus ring, and changes in aperture by operating the aperture ring, separately.

The camera described in Patent Document 1 has an AF/MF changeover switch, in addition to the focus ring, for selectively switching between an auto focus mode of automatically performing focusing and a manual focus mode of performing focusing by manual operation. According to the camera described in Patent Document 1, when the manual focus mode is selected, a focus motor is driven based on the amount of rotation and a rotational direction of the focus ring, so that the focus lens is moved in an optical axis direction.

Additionally, the camera described in Patent Document 1 has an exposure setting dial, in addition to the aperture ring, for switching exposure modes. According to the lens barrel described in Patent Document 1, it is possible to select, by operating the exposure setting dial, a desired mode out of a program AE mode in which the exposure is fully automatically set, an aperture priority AE mode in which the exposure is set based on an aperture being set, a shutter speed priority AE mode in which the exposure is set based on a shutter speed being set, and a manual exposure mode in which the exposure is fully manually set.

According to the camera described in Patent Document 1, when the aperture priority AE mode or the manual exposure mode is selected, an aperture motor is driven based on the amount of rotation and the rotational direction of the aperture ring to thereby operate an aperture blade, so that the exposure is controlled.

Meanwhile, there is disclosed, in Patent Document 2, a lens device provided with a front spherical lens, a first moving lens unit, an iris device, a second moving lens unit, a zoom ring for moving the first moving lens unit to an optical axis, an iris ring for changing an iris aperture of the iris device, a focus ring for moving the second moving lens unit to the optical axis.

According to the lens device described in Patent Document 2, the first moving lens unit and the zoom ring, the iris device and the iris ring, and the second moving lens unit and the focus ring constitute integrated blocks, respectively. For that reason, it is configured such that respective blocks are stacked in order and fixed with screws or the like in assembling the lens device.

[Patent Document 1] Japanese Unexamined Patent Publication (Kokai) No. 2003-29131
[Patent Document 2] Japanese Unexamined Patent Publication (Kokai) No. 2002-207154

DISCLOSURE OF THE INVENTION

Problems to be Solved by the Invention

In the camera described in Patent Document 1, however, the AF/MF changeover switch is arranged in a position with which an operation of the focus ring is not associated. Moreover, in the camera described in Patent Document 1, the exposure setting dial is arranged in a position with which an operation of the aperture ring is not associated.

The camera described in Patent Document 1 has therefore had a problem of not providing excellent operability because the AF/MF changeover switch and the exposure setting dial have been arranged in the positions with which the manual operating members of the focus ring and the aperture ring have not been associated.

Additionally, the camera described in Patent Document 1 has had a problem of an increase in parts because the AF/MF changeover switch and the exposure setting dial are arranged in the positions with which the manual operating members of the focus ring and the aperture ring have not been associated.

Meanwhile, in the lens device described in Patent Document 2, when quality of images formed by a lens system has been evaluated, all of ring members have been structurally required to be attached. As a result, there has been a problem of complication in assembly of the ring members.

Moreover, in the lens device described in Patent Document 2, if the ring member has needed to be changed due to damage or deterioration, the imaging optical system has been required to be decomposed. As a result, when the ring member has been exchanged, adjustment from the imaging optical system has needed to be performed, thus making maintenance difficult.

Further, in the imaging device, in order to increase expandability of the imaging optical system, a filter mount is fixed for holding a filter or other optical systems, which should be arranged on a side closest to an object. The filter mount has a structure of fixing the filter or the other optical systems by a screw, wherein the screw with a diameter almost the same as that of the lens system arranged on the side closest to the object is usually formed.

However, also as to the filter mount, if it has needed to be exchanged due to damage or deterioration, the imaging optical system has been required to be decomposed. For that reason, also when exchanging the filter mount, adjustment from the imaging optical system has needed to be performed, thus making maintenance difficult.

It is an object of the present invention to provide the lens barrel in which operability for the user is improved and a reduction in parts is achieved while provided with the manual operating member, the imaging device provided with the lens barrel, and the camera provided with the imaging device.

Moreover, it is an object of the present invention to facilitate assembly and maintenance of the lens barrel having a cylindrical shape coaxial to the optical axis of the imaging optical system, and including the operating member which is manually operated in a rotational manner, and of the imaging device.

Solution to the Problems

The foregoing object is achieved by the following lens barrel.

In a lens barrel used for an imaging device capable of converting an optical image of an object into an electrical image signal, the lens barrel is provided with an imaging optical system for forming an optical image of an object, a focus lens unit which is included in the imaging optical system and capable of changing an object distance by moving in a direction parallel to an optical axis of the imaging optical system, moving means for moving the focus lens unit in the direction parallel to the optical axis, driving means for driving the moving means, a first operating member which is of a cylindrical shape coaxial to the optical axis of the imaging optical system and manually operated in a rotational manner in order to drive the driving means to thereby move the focus lens unit by the moving means, and a second operating member which is integrally provided in the first operating member, and operated in order to switch between a state of allowing a manual rotating operation of the first operating member and a state of preventing the manual rotating operation.

According to the configuration described above, a user does not need to take a hand off from the first operating member when changing a focus mode. Thus, it is possible to provide the lens barrel excellent in operability for the user.

Moreover, according to the configuration described above, a focus mode setting and a manual focusing can be made only by the operation of the first operating member. Thus, it is possible to provide the lens barrel excellent in operability for the user.

Moreover, according to the configuration described above, the rotating operation of the first operating member serves two functions, namely, a function as an operating member for performing manual focusing, and a function as a switch for switching the focus mode. Thus, it is possible to provide the lens barrel excellent in operability for the user. Moreover, since it also serves as the switch, a reduction in parts can be achieved.

The foregoing object is achieved by the following lens barrel.

In a lens barrel used for an imaging device capable of converting an optical image of an object into an electrical image signal, the lens barrel is provided with an imaging optical system for forming an optical image of an object, an aperture stop which is provided in a specified position on the optical axis of the imaging optical system and capable of changing an aperture of the imaging optical system, driving means for operating the aperture stop, a first operating member which is of a cylindrical shape coaxial to the optical axis of the imaging optical system and manually operated in a rotational manner in order to drive the driving means to thereby change the aperture of the aperture stop by the changing means, and a second operating member which is integrally provided in the first operating member, and operated in order to switch between a state of allowing the manual rotating operation of the first operating member and the state of preventing the manual rotating operation.

According to the configuration described above, the user does not need to take a hand off from the first operating member when changing an aperture mode among exposure setting modes. Thus, it is possible to provide the lens barrel excellent in operability for the user.

Moreover, according to the configuration described above, a setting of the aperture mode and a manual change of the aperture can be made only by the operation of the first operating member. Thus, it is possible to provide the lens barrel excellent in operability for the user.

Moreover, according to the configuration described above, the rotating operation of the first operating member serves two functions, namely, a function as an operating member for manually setting the aperture, and a function as a switch for switching the aperture mode. Thus, it is possible to provide the lens barrel excellent in operability for the user. Moreover, since it also serves as the switch, a reduction in parts can be achieved.

The foregoing object is achieved by the following imaging device.

In an imaging device capable of converting an optical image of an object into an electrical image signal, the imaging device is provided with a lens barrel including the imaging optical system for forming the optical image of the object, an image sensor for converting the optical image formed by the imaging optical system into the electrical image signal, and control means, wherein the lens barrel includes a focus lens unit which is included in the imaging optical system and capable of changing an object distance by moving in a direction parallel to an optical axis of the imaging optical system, moving means for moving the focus lens unit in the direction parallel to the optical axis, driving means for driving the moving means based on the control signal, a first operating member which is of a cylindrical shape coaxial to the optical axis of the imaging optical system and manually operated in a rotational manner, a second operating member which is integrally provided in the first operating member, and operated in order to switch between the state of allowing the manual rotating operation of the first operating member and the state of preventing the manual rotating operation, and angle of rotation detecting means for outputting a signal in accordance with an angle of rotation of the first operating member, wherein when the first operating member is rotationally operated in a state where the rotating operation of the first operating member is allowed by the operation of the second operating member, the control means generates the control signal for moving the focus lens unit based on the signal outputted by the angle of rotation detecting means.

According to the configuration described above, the user does not need to take a hand off from the focus ring 32 when changing the focus mode. Thus, it is possible to provide the imaging device excellent in operability for the user.

Moreover, according to the configuration described above, the rotating operation of the first operating member serves two functions, namely, a function as an operating member for performing manual focusing, and a function as a switch for switching the focus mode. Thus, it is possible to provide the imaging device excellent in operability for the user. Moreover, since it also serves as the switch, a reduction in parts can be achieved.

Moreover, according to the configuration described above, the user can rotate the first operating member with a small torque in the case of the manual focus. Thus, it is possible to provide the imaging device excellent in operability for the user.

Preferably, the imaging device is further provided with operation means for calculating a defocus amount of the imaging optical system, wherein when an operation start is instructed in a state where the rotating operation of the first operating member is prevented by the operation of the second operating member, the control means generates a control signal for moving the focus lens unit based on an operation result of the operation means.

According to the configuration described above, in the case of an auto focus mode, the first operating member does not rotate. Thus, it is possible to provide the imaging device excellent in operability for the user.

Specifically, the defocus amount of the operation means is calculated based on the image signal outputted by the image sensor.

Preferably, the imaging optical system is a zoom lens system, and the imaging device is further provided with operation means for calculating a defocus amount of the imaging optical system, and focal length detection means for detecting a focal length of the imaging optical system, wherein when the operation start is instructed in a state where the rotating operation of the first operating member is prevented by the operation of the second operating member, the control means generates the control signal for moving the focus lens unit based on the operation result of the operation means and a detection result of the focal length detection means.

The foregoing object is achieved by the following imaging device.

In an imaging device capable of converting an optical image of an object into an electrical image signal, the imaging device is provided with a lens barrel including the imaging optical system for forming the optical image of the object, an image sensor for converting the optical image formed by the imaging optical system into the electrical image signal, and control means, wherein the lens barrel includes an aperture stop which is provided in a specified position on the optical axis of the imaging optical system and capable of changing an aperture of the imaging optical system, driving means for operating the aperture stop based on the control signal, a first operating member which is of a cylindrical shape coaxial to the optical axis of the imaging optical system and manually operated in a rotational manner in order to drive the driving means to thereby change the aperture of the aperture stop by the changing means, a second operating member which is integrally provided in the first operating member, and operated in order to switch between the state of allowing the manual rotating operation of the first operating member and the state of preventing the manual rotating operation, and angle of rotation detecting means for outputting a signal in accordance with an angle of rotation of the first operating member, wherein when the first operating member is rotationally operated in a state where the rotating operation of the first operating member is allowed by the operation of the second operating member, the control means generates the control signal for changing an aperture of the aperture stop based on the signal outputted by the angle of rotation detecting means.

According to the configuration described above, the user does not need to take a hand off from the first operating member when changing the aperture among the exposure settings. Thus, it is possible to provide the imaging device excellent in operability for the user.

Moreover, according to the configuration described above, the rotating operation of the first operating member serves two functions, namely, a function as the operating member for manually setting the aperture, and a function as a switch for switching the aperture among the exposure settings. Thus, it is possible to provide the imaging device excellent in operability for the user. Moreover, since it also serves as the switch, a reduction in parts can be achieved.

Furthermore, according to the configuration described above, the user can rotate the first operating member with a small torque in manually setting the aperture. Thus, it is possible to provide the imaging device excellent in operability for the user.

Preferably, the imaging device is further provided with a photometry means for detecting a quantity of light, and an operation means for calculating an aperture of the imaging optical system based on a detection result of the photometry means, wherein when the operation start is instructed in a state where the rotating operation of the first operating member is prevented by the operation of the second operating member, the control means generates the control signal for changing the aperture of the aperture stop based on an operation result of the operation means.

According to the configuration described above, in the case of an auto aperture mode, the first operating member does not rotate. Thus, it is possible to provide the imaging device excellent in operability for the user.

Specifically, the photometry means is an image sensor.

Preferably, the imaging device is further provided with photometry means for measuring a quantity of light, shutter speed setting means for setting a shutter speed, operation means for calculating the aperture of the imaging optical system based on the detection result of the photometry means and a setting of the shutter speed setting means, wherein when the operation start is instructed in a state where the rotating operation of the first operating member is prevented by the operation of the second operating member, the control means generates the control signal for changing the aperture of the aperture stop based on an operation result of the operation means.

Specifically, the photometry means is an image sensor.

Effect of the Invention

According to the present invention, it is possible to provide the lens barrel in which excellent operability for the user is improved and a reduction in parts is achieved while provided with the manual operating member, the imaging device provided with the lens barrel, and the camera provided with the imaging device.

Moreover, according to the present invention, assembly and maintenance of the lens barrel being of a cylindrical shape coaxial to the optical axis of the imaging optical system and including the operating member which is manually operated in a rotational manner, and the imaging device are made easier.

BRIEF DESCRIPTION OF THE DRAWINGS

FIG. 19A is a schematic sectional view when a focus mode switching button according to the modification of the embodiment of the present invention is in the first stop position.

FIG. 19B is a schematic sectional view when the focus mode switching button according to the modification of the embodiment of the present invention is between the first stop position and the second stop position.

FIG. 19C is a schematic sectional view when the focus mode switching button according to the modification of the embodiment of the present invention is in the second stop position.

DESCRIPTION OF THE REFERENCE CHARACTERS

Figure 1:
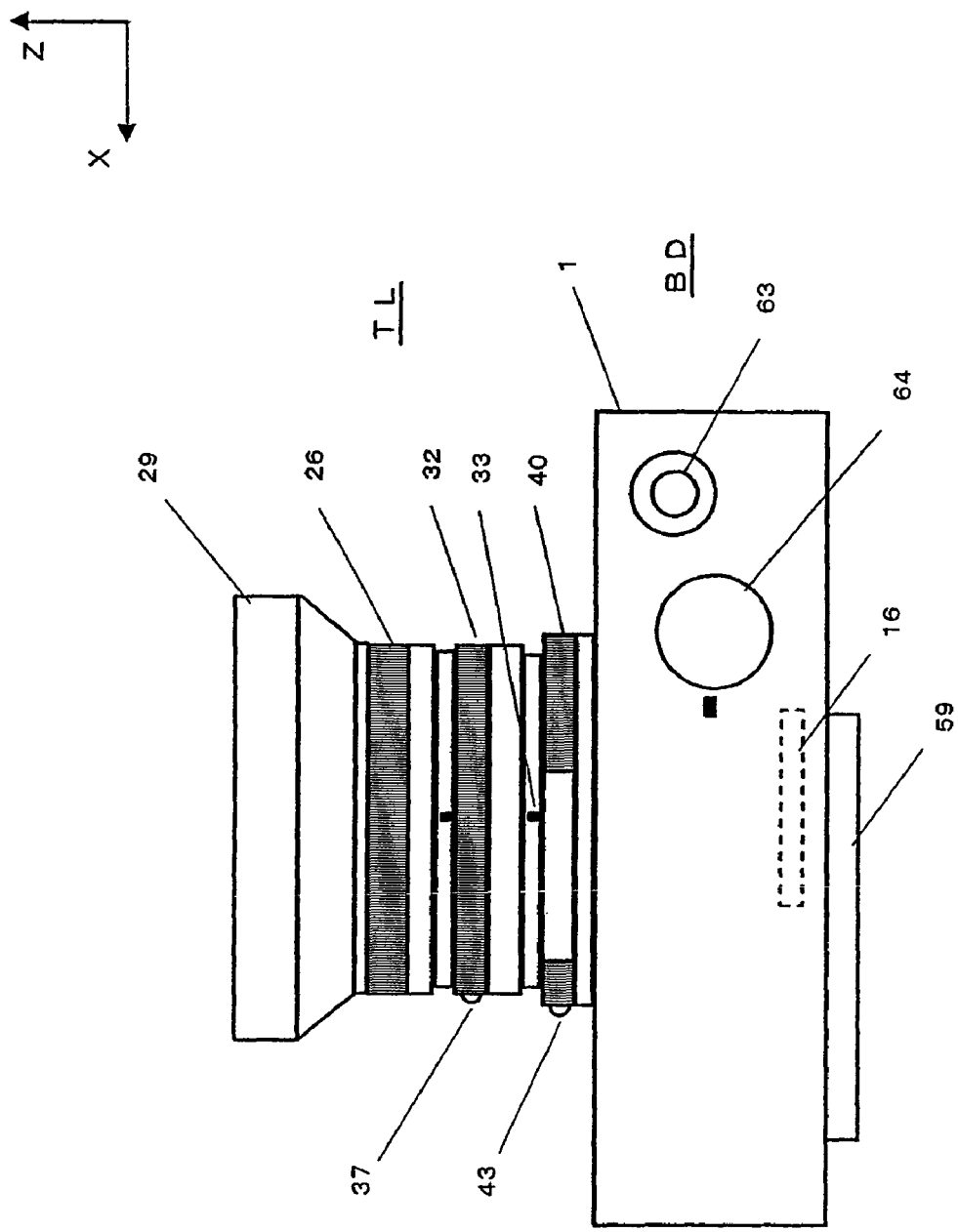
FIG. 1 is a top view of a digital camera according to an embodiment of the present invention.

BD: Main body
TL: Imaging device
L: imaging optical system
L11: lens unit
L22: lens unit
L33: lens unit
L44: lens unit
L55: lens unit (focus lens unit)
1: Digital camera
2: Lens unit
3: First lens unit fixing frame 4a, 4b, 4c: Guide pole
5: Master flange
7: Cam cylinder
9: Third lens moving frame
15: Focus motor
21: Zoom linear sensor
21a: Slider of zoom linear sensor
25: Ring unit
26: Zoom ring
27: First ring fixing frame
28: Zoom ring unit
29: Filter mount
32: Focus ring
33: Indicator
34: Cam groove of focus ring
35: Focus linear sensor
35a: Slider of focus linear sensor
36: Third ring fixing frame
37: Focus mode switching button
38: Second ring fixing frame
40: Aperture ring
41: Aperture linear sensor
41a: Slider of aperture linear sensor
42: Cam groove of aperture ring
43: Aperture mode switching button
44: Fourth ring fixing frame
45: Manual ring unit
46: Lens barrel
49: Microcomputer
60: Zoom controller
61: Focus controller
62: Aperture controller
63: Shutter controller
64: Shutter button
65: Shutter speed setting dial

BEST MODE FOR CARRYING OUT THE INVENTION

FIG. 1 is a top view of a digital camera according to an embodiment of the present invention. The digital camera is provided roughly with an imaging device TL and a main body BD.

The main body BD is a housing to be supported by a user at the time of shooting an object. The main body BD includes a shutter button 64 and a shutter speed setting dial 65. The shutter button 64 and the shutter speed setting dial 65 are provided on the right-hand side of the top of the main body BD.

The shutter speed setting dial 65 is an operating member for setting a shutter speed by being rotationally operated. In addition, the shutter speed setting dial 65 has an auto-position at which the shutter speed is automatically set.

The main body BD also includes a liquid crystal monitor LCD and a loudspeaker SP. The liquid crystal monitor LCD and the loudspeaker SP are provided in a surface on the user side of the main body BD. Actions of the liquid crystal monitor LCD and the loudspeaker SP will be described hereinafter.

The imaging device TL includes a lens barrel 46 and an image sensor 16. The lens barrel 46 holds therein an imaging optical system L which will be described hereinafter. The image sensor 16 is a CCD. The image sensor 16 converts an optical image that the imaging optical system L forms into an electrical image signal.

It should be noted herein that in all of the explanations of the embodiments, a coordinate system is defined on the basis of an optical axis AX of the imaging optical system L. That is, a direction parallel to the optical axis AX of the imaging optical system L will be defined as a z direction, and a direction which is perpendicular to this z direction and included in a plane parallel to the top view of FIG. 1 will be defined as an x direction. Additionally, a direction perpendicular to both directions of the x direction and the z direction will be defined as a y direction. This xyz coordinate system is a three-dimensional rectangular coordinate system.

The lens barrel 46 has a filter mount 29 on the side closest to the object. The lens barrel 46 has a zoom ring 26, a focus ring 32, and an aperture ring 40 in order from the filter mount 29 towards the main body BD (a negative direction of a z-axis). All of the zoom ring 26, the focus ring 32, and the aperture ring 40 are rotationally operated members having a cylindrical shape, and are rotatably arranged on the outer peripheral surface of the lens barrel 46.

The focus ring 32 has a focus mode switching button 37. The focus mode switching button 37 is a pushbutton switch integrally provided in the focus ring 32. The aperture ring 40 has an aperture switching button 43. The aperture switching button 43 is a pushbutton switch integrally provided in the aperture ring 40. The lens barrel 46 shows an indicator 33 which indicates a current position resulted from a rotating operation of the focus ring 32 and the aperture ring 40, and the indicator 33 which indicates a current position resulted from a rotating operation of the zoom ring 26. Operations and structures of the filter mount 29, the zoom ring 26, the focus ring 32, the aperture ring 40, and the like will be further described hereinafter.

Figure 2:
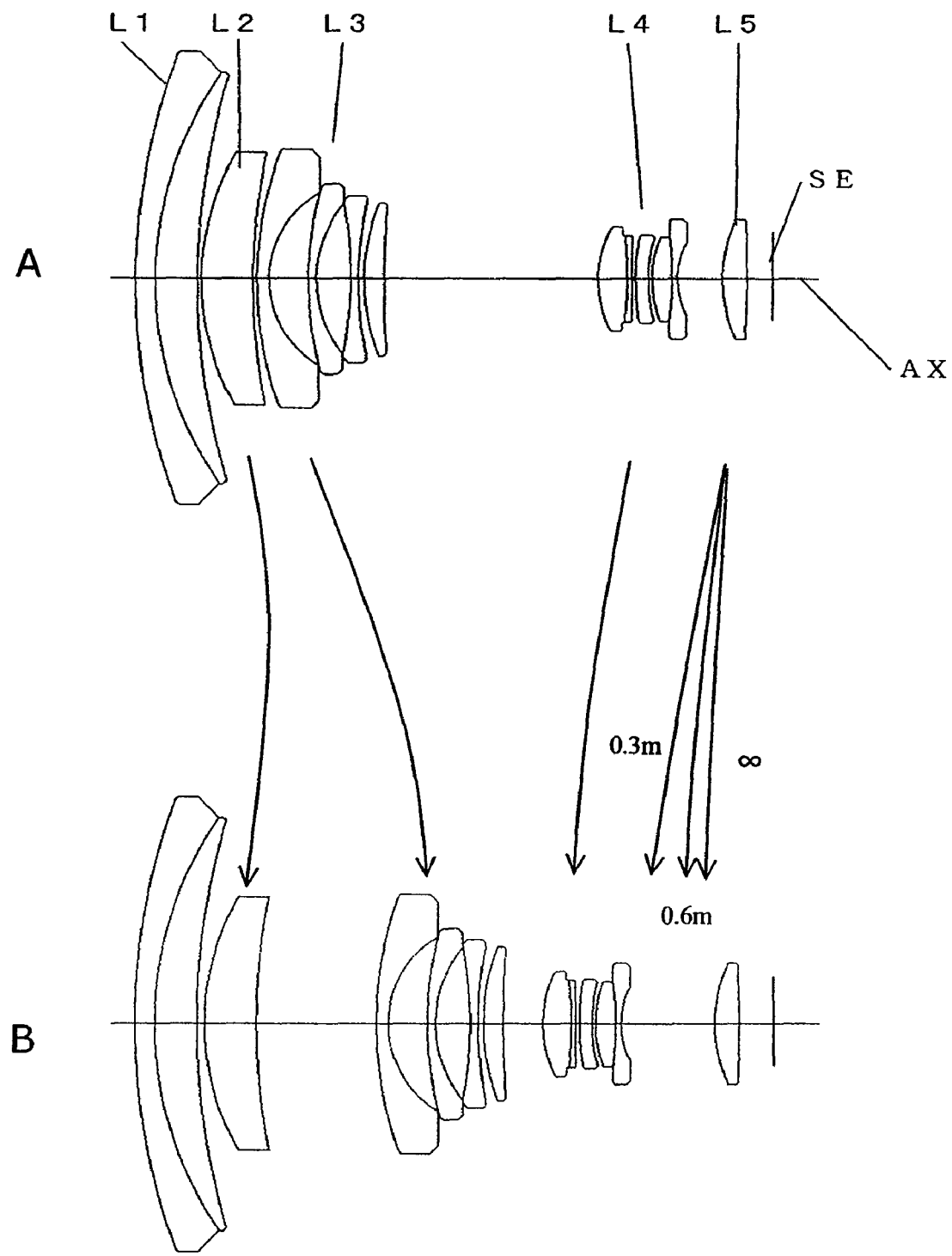
FIG. 2 is a block diagram of an imaging optical system of the digital camera in accordance with the embodiment of the present invention.

FIG. 2 is a block diagram of the imaging optical system of the digital camera in accordance with the embodiment of the present invention. The imaging optical system L of the digital camera in accordance with the embodiment is a zoom lens system, in which an imaging magnification can be changed as desired. FIG. 2A illustrates a diagram of a lens configuration in a focused state at infinity at a wide angle end (a state of the shortest focal length) of the imaging optical system L. FIG. 2B illustrates a diagram of a lens configuration in a focused state at infinity at a zooming end (a state of the longest focal length) of the imaging optical system L.

The imaging optical system L includes a first lens unit L1, a second lens unit L2, a third lens unit L3, a fourth lens unit L4, and a fifth lens unit L5 in order from the object towards the image (in the negative direction of the z-axis). It should be noted herein that a straight line on the image side of the fifth lens unit L5 is a position of an image plane of an optical image which the imaging optical system L forms.

Arrows given in the figures represent moving loci of the second through fifth lens units in zooming from the wide angle end to the zooming end. Meanwhile, in the moving locus of the fifth lens unit L5, an arrow to which an infinite symbol is given represents a moving locus thereof in a focused state when an object distance is infinite. Similarly, an arrow to which a character of 0.3 m is given represents a moving locus thereof in a focused state when the object distance is 0.3 m, and an arrow to which a character of 0.6 m is given represents a moving locus thereof in a focused state when the object distance is 0.6 m, respectively.

Among respective lens units, the first lens unit L1, the second lens unit L2, the third lens unit L3, and the fourth lens unit L4 are zoom lens units which are mainly in charge of zooming. Meanwhile, the fifth lens unit L5 is a focus lens unit which is mainly in charge of moving the position of the image plane in a direction parallel to the optical axis AX and focusing by zooming. The first through fifth lens units then mutually collaborate to form the optical image of the object.

The first lens unit L1 is composed of one cemented lens component obtained by cementing two lens elements together. The first lens unit L1 does not move with respect to the position of the image plane in zooming from the wide angle end to the zooming end. The second lens unit L2 is composed of one lens element. The second lens unit L2 moves to the image side along with the optical axis AX while following a convex moving locus in zooming from the wide angle end to the zooming end. The third lens unit L3 is composed of four lens elements. The third lens unit L3 slightly moves to the image side along with the optical axis AX while following a convex moving locus towards the image side in zooming from the wide angle end to the zooming end. The fourth lens unit L4 includes two cemented lenses obtained by cementing two lens elements, and is composed of two cemented lenses and one single lens. The fourth lens unit L4 slightly moves to the image side along with the optical axis AX while following a convex moving locus to the image side in zooming from the wide angle end to the zooming end. The fifth lens unit L5 is composed of one single lens element. The fifth lens unit L5 almost monotonously moves along with the optical axis AX while following a moving locus towards the object side in zooming from the wide angle end to the zooming end.

As for the fifth lens unit L5, the nearer the object distance becomes, the larger the moving distance thereof to the object side becomes. In other words, when a focusing adjustment is performed from a focused state at infinity to a focused state at close proximity of the object distance at an arbitrary focal length, the fifth lens unit L5 moves to the object side.

Figure 3:
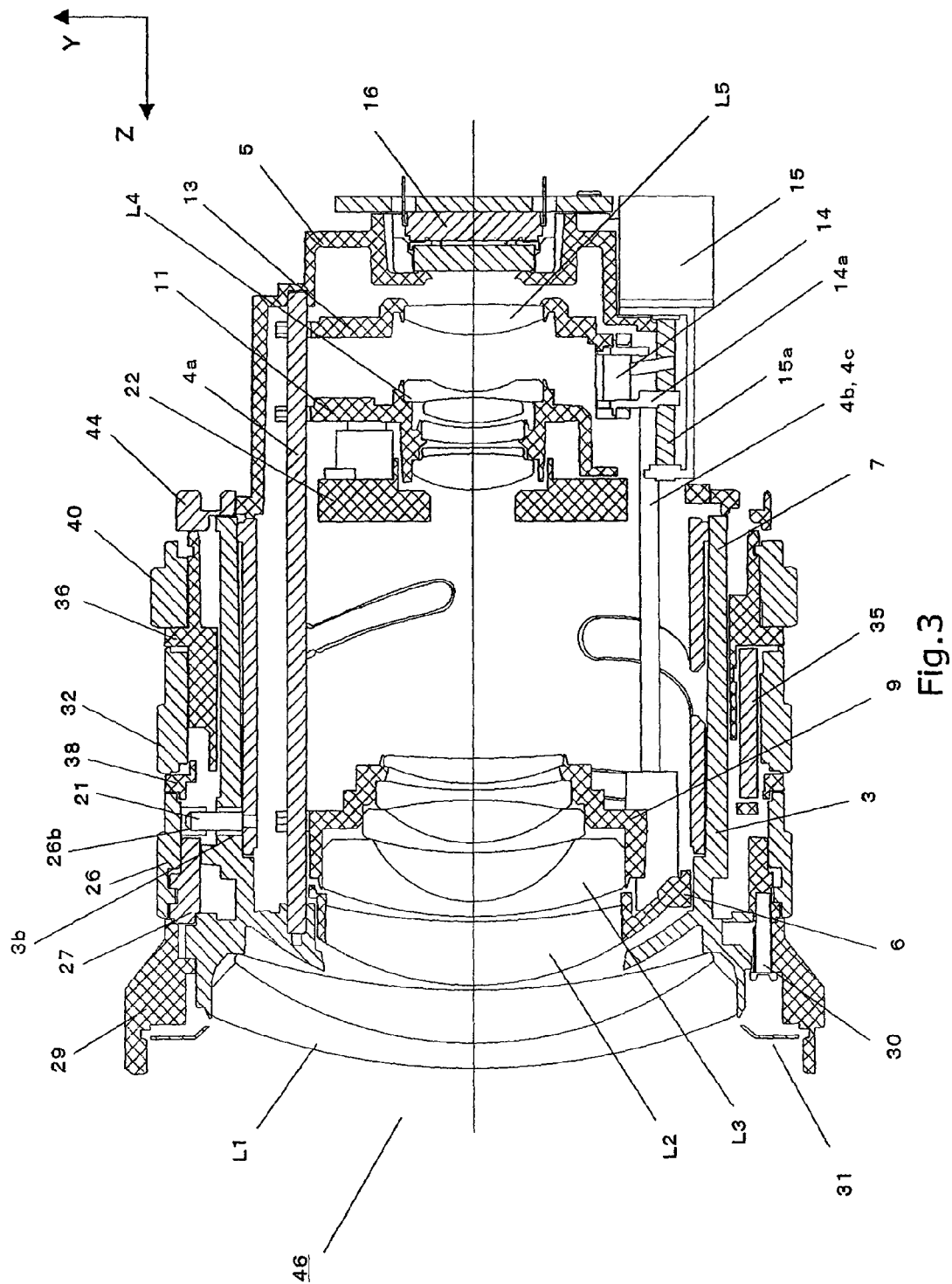
FIG. 3 is a sectional view of a lens barrel in accordance with the embodiment of the present invention.

FIG. 3 is a sectional view of the imaging device TL in accordance with the embodiment of the present invention, specifically, FIG. 3 is a sectional view of the imaging device TL which is cut by a plane parallel to a yz plane including the optical axis, and more specifically, FIG. 3 is a sectional view when the imaging optical system L of the lens barrel 46 is in the wide angle end.

Figure 4:
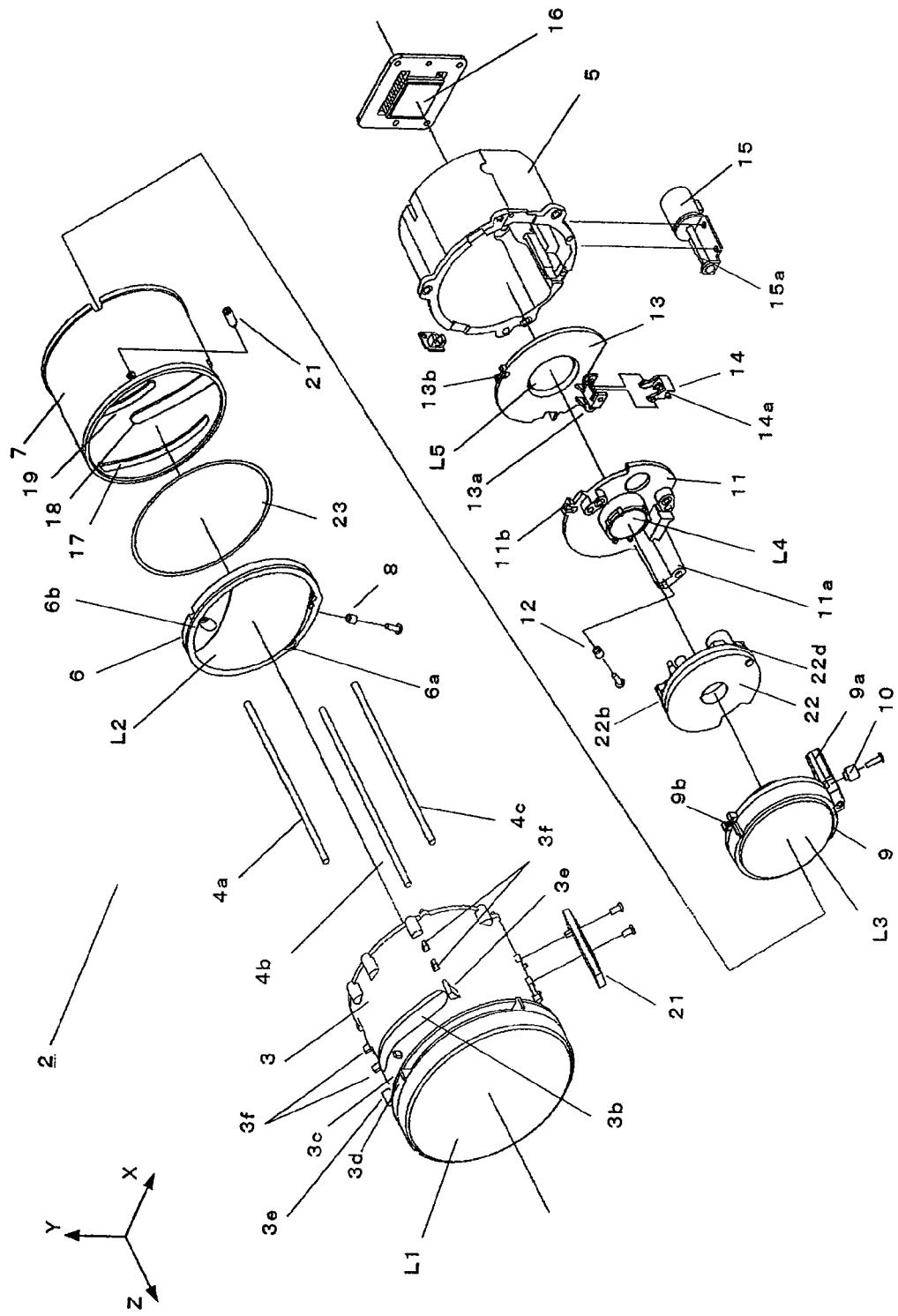
FIG. 4 is an exploded perspective view of a lens unit in accordance with the embodiment of the present invention.

The lens barrel 46 is composed roughly of a lens unit 2 for holding the imaging optical system L, the filter mount 29, and a ring unit 25. FIG. 4 is an exploded perspective view of the lens unit in accordance with the embodiment of the present invention. In FIG. 3 and FIG. 4, the lens unit 2 roughly includes a first lens unit fixing frame 3, three guide poles 4a, 4b, and 4c, a master flange 5, a second lens moving frame 6, a ring washer 23, a cam cylinder 7, a third lens moving frame 9, an aperture stop 22, a fourth lens moving frame 11, and a fifth lens moving frame 13.

The first lens unit fixing frame 3 has a cylindrical shape, and fixes the first lens unit L1 to the object side of the optical axis AX (a positive direction of the z-axis). The first lens unit fixing frame 3 holds ends of the three guide poles 4a, 4b, and 4c, which are in parallel to the z-axis. The first lens unit fixing frame 3 has a long hole opening 3b formed corresponding to a predetermined center angle along the outer peripheral surface in a portion where the first lens unit L1 having a cylindrical shape is not fixed.

The first lens unit fixing frame 3 fixes a zoom linear sensor 21 to the outer peripheral surface. The first lens unit fixing frame 3 has a long hole opening 3a formed in a position corresponding to the zoom linear sensor 21 along the direction parallel to the optical axis AX. A detailed structure of the zoom linear sensor 21 will be hereinafter described.

The first lens unit fixing frame 3 has a rib 3c, a rib 3d, a rib 3e, and a rib 3f, which are projectedly formed on the outer peripheral surface in an outer peripheral direction. Each of the ribs is formed in a specified position on the outer peripheral surface, and serves as a basis of positioning the filter mount and the ring unit, which will be hereinafter described.

The master flange 5 has a plane perpendicular to the optical axis AX, and a cylindrical portion extended in parallel to the optical axis AX. The master flange 5 holds the other ends of three guide poles 4a, 4b, and 4c to the cylindrical portion. The master flange 5 has a rectangular opening in the plane perpendicular to the optical axis AX, and the image sensor 16 is fixed to this opening portion. Incidentally, as for the image sensor 16, a low pass filter 16b is arranged and fixed to the object side of a light receiving portion.

Additionally, the master flange 5 fixes a focus motor 15 to the bottom of a negative direction of the y direction. The focus motor 15 has a rotatable shaft extended in a positive direction of the z-axis parallel to the optical axis AX. As for the focus motor 15, a feed screw 15a is formed in the rotatable shaft.

The second lens moving frame 6 holds the second lens unit L2. The second lens moving frame 6 has, near the outer periphery, a rotation regulating section 6b which is a through-hole, and a bearing 6a which is a through-hole extended in the direction parallel to the optical axis AX. A guide pole 4b passes through the bearing 6a. A guide pole 4a passes through the rotation regulating section 6b.

The guide pole 4b and the bearing 6a are coupled to each other with a predetermined fitting accuracy. By the guide pole 4b and the bearing 6a, the second lens moving frame 6, while keeping a posture with respect to the optical axis AX, is movably supported in a direction parallel to the z-axis. Meanwhile, as for the second lens moving frame 6, the rotational degree of freedom within a plane parallel to an xy plane perpendicular to the z-axis is restricted because the guide pole 4a is passed through to the rotation regulating section 6b.

The second lens moving frame 6 has a cam pin 8 projected towards the outer periphery. The cam pin 8 is fixed to a specified position of the outer peripheral surface of the second lens moving frame 6 with a screw.

The third lens moving frame 9 holds the third lens unit L3. The third lens moving frame 9 has, near the outer periphery, a rotation regulating section 9b which is a through-hole, and a bearing 9a which is a through-hole extended in the direction parallel to the optical axis AX. A guide pole 4c passes through the bearing 9a. The guide pole 4a passes through the rotation regulating section 9b.

The bearing 9a and the guide pole 4c are coupled to each other with a predetermined fitting accuracy. By the bearing 9a and the guide pole 4c, the third lens moving frame 9, while keeping a posture with respect to the optical axis AX, is movably supported in the direction parallel to the z-axis. Additionally, for the third lens moving frame 9, the rotational degree of freedom within the plane parallel to the xy plane perpendicular to the z-axis is restricted because the guide pole 4a is passed through to the rotation regulating section 9b.

The third lens moving frame 9 has a cam pin 10 projected towards the outer periphery in a position of the bearing 9a. The cam pin 10 is fixed to the outer peripheral surface of the third lens moving frame 9 with a screw from a direction perpendicular to the optical axis AX.

Figure 5:
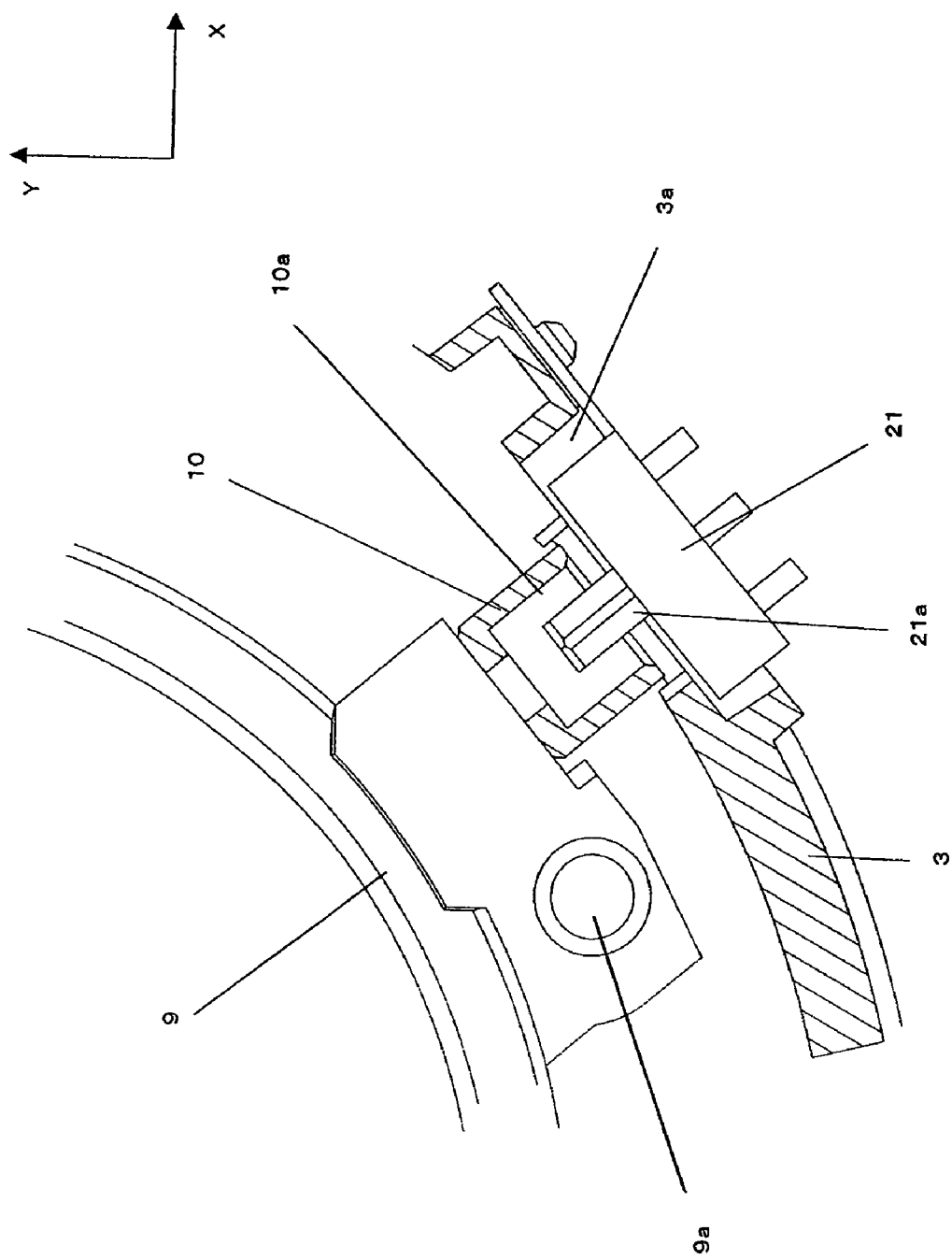
FIG. 5 is a partially sectional view near a bearing of a third lens moving frame of the lens barrel according to the present invention.

FIG. 5 is a partially sectional view near the bearing of the third lens moving frame of the lens barrel according to the present invention. In FIG. 5, the cam pin 10 of the third lens moving frame 9 has a fitting hole 10a at the tip. Incidentally, in FIG. 5, the cam cylinder 7 is omitted in order to simplify the description.

A slider 21a of the zoom linear sensor 21 is inserted in the fitting hole 10a. The fitting hole 10a has a circular section seen from the outer peripheral surface. The slider 21a has a rectangular section which is extended in the direction parallel to the optical axis AX (a direction of the z-axis). The slider 21a is inserted in the fitting hole 10a without gap thereinside.

Figure 6:
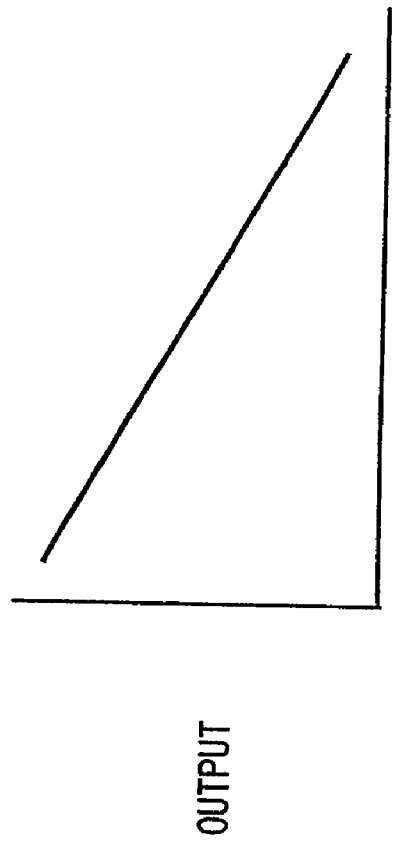
FIG. 6A is a circuit diagram of a zoom linear sensor of the lens barrel in accordance with the embodiment of the present invention.
FIG. 6B is a graph showing an output of the zoom linear sensor of the lens barrel in accordance with the embodiment of the present invention.
Figure 6:
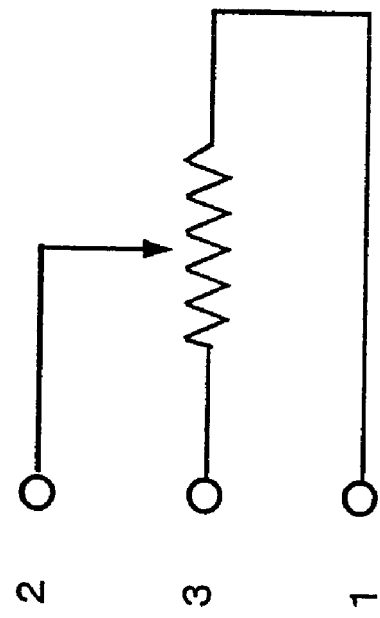

FIG. 6A is a circuit diagram of the zoom linear sensor of the lens barrel in accordance with the embodiment of the present invention. Meanwhile, FIG. 6B is a graph showing an output of the zoom linear sensor of the lens barrel in accordance with the embodiment of the present invention. The zoom linear sensor 21 is a variable resister. In the zoom linear sensor 21, sliding the slider 21a on a magnetic resistive element which is not shown, under a condition of applying a predetermined voltage between a first terminal and a third terminal causes a change in the output value outputted from a second terminal. As can be seen from FIG. 6B, a moving stroke of the slider 21a and the output of the second terminal have a relation of a linear function.

When the third lens moving frame 9 moves in the direction parallel to the optical axis AX (direction of the z-axis), the slider 21a inserted in the cam pin 10 will move in the direction parallel to the optical axis AX (direction of the z-axis). When the slider 21a moves, movement of the third lens moving frame 9 can be detected based on the output from the second terminal of the zoom linear sensor 21. As described using FIG. 2, the third lens unit L3 moves towards the image side in zooming from the wide angle end to the zooming end. For this reason, detecting the movement of the third lens moving frame 9 by the zoom linear sensor 21 will lead a detection of a focal length of the imaging optical system L.

The fourth lens moving frame 11 holds the fourth lens unit L4. The fourth lens moving frame 11 has a cylindrical portion for holding the fourth lens unit L4 in the center, and other portions are of a disc-shape perpendicular to the optical axis AX. The fourth lens moving frame 11 has a bearing 11a and a rotation regulating section 11b, which are through-holes in specified positions of the disc. The guide pole 4a passes through the bearing 11a. The guide pole 4b passes through the rotation regulating section 11b. For this reason, the fourth lens moving frame 11 is movably supported in the direction parallel to the z-axis under a condition that rotational degree of freedom around the z-axis is restricted.

The fourth lens moving frame 11 has a cam pin 12 projected towards the outer periphery in a position of the bearing 11a. The cam pin 12 is fixed to the outer peripheral surface of the fourth lens moving frame 11 with a screw. As described above, the lens barrel 46 according to the present embodiment is constituted such that the guide pole 4b is passed through each of the bearings formed in the second lens moving frame 6, the fourth lens moving frame 11, and the fifth lens moving frame 13. Meanwhile, the lens barrel 46 according to the present embodiment is constituted such that the guide pole 4c is passed through the bearing 9a formed in the third lens moving frame 9.

The fifth lens moving frame 13 holds the fifth lens unit L5. The fifth lens moving frame 13 has a cylindrical portion for holding the fifth lens unit L5 in the center, and other sections are of a disc-shape. The fifth lens moving frame 13 has a bearing 13a and a rotation regulating section 13b which are through-holes, in specified positions of the disc. The guide pole 4a passes through the bearing 13a. The guide pole 4b passes through the rotation regulating section 13b. For this reason, the fifth lens moving frame 13 is movably supported in the direction parallel to the z-axis under a condition that rotational degree of freedom around the z-axis is restricted.

The fifth lens moving frame 13 has a rack supporting portion 14 extended in the negative direction of the y direction from the bearing 13a. The rack supporting portion 14 has a rack 14a formed at the tip thereof in the direction parallel to the optical axis AX (direction of the z-axis). The rack 14a engages with the feed screw 15a of the aforementioned focus motor 15.

The focus motor 15 rotates based on the driving signal supplied thereto. When the focus motor 15 rotates, rotary motion is converted into linear motion in the direction parallel to the optical axis AX (direction of the z-axis) by the feed screw 15a and the rack 14a. As a result of the conversion from rotary motion into linear motion, the fifth lens moving frame 13 moves.

Incidentally, each of the bearings formed in each of the lens moving frames serves as an axle hole when each of the lens moving frames moves in the direction parallel to the optical axis AX. Since each of the lens moving frames moves while keeping a posture in a direction parallel to the optical axis, each of the bearings is desirably constituted such that the through-hole in the direction parallel to the optical axis AX (direction of the z-axis) is increased in length.

Since the lens barrel 46 is constituted such that the different guide poles pass through the adjacent second lens moving frame 6 and the third lens moving frame 9, respectively, the through-hole in the direction parallel to the optical axis AX (direction of the z-axis) of the rotation regulating section can be sufficiently increased in length. Similarly, since the different guide poles pass through the third lens moving frame 9 and the fourth lens moving frame 11, respectively, the through-hole in the direction parallel to the optical axis AX (direction of the z-axis) of the rotation regulating section can be sufficiently increased in length.

The aperture stop 22 is fixed to a disc perpendicular to the optical axis AX of the fourth lens moving frame 11. The aperture stop 22 has an aperture blade which is not shown, an aperture drive motor 22a, a shutter blade which is not shown, and a shutter drive motor 22b.

The aperture drive motor 22a drives the aperture blade by rotating based on an externally supplied driving signal. The aperture blade is constituted so that an aperture diameter may be changed by being driven. An aperture of the imaging optical system L is changed by operation of the aperture blade.

The shutter drive motor 22b drives the shutter blade by rotating based on an externally supplied driving signal. By being driven, the shutter blade performs a series of operations of putting an optical path of the imaging optical system in the states of from un-release through release to un-release again at intervals of a predetermined time.

The cam cylinder 7 is rotatably supported around the optical axis AX because specified positions of its outer peripheral surface and an inner peripheral surface of the first lens unit fixing frame 3 fit in each other with a predetermined accuracy. The cam cylinder 7 includes three of a cam groove 17, a cam groove 18, and a cam groove 19, which pass through the inner peripheral surface and the outer peripheral surface.

The cam groove 17 couples with the cam pin 8 provided in the second lens moving frame 6. The cam groove 18 couples with the cam pin 10 provided in the third lens moving frame 9. The cam groove 19 couples with the cam pin 12 provided in the fourth lens moving frame 11.

Figure 7:
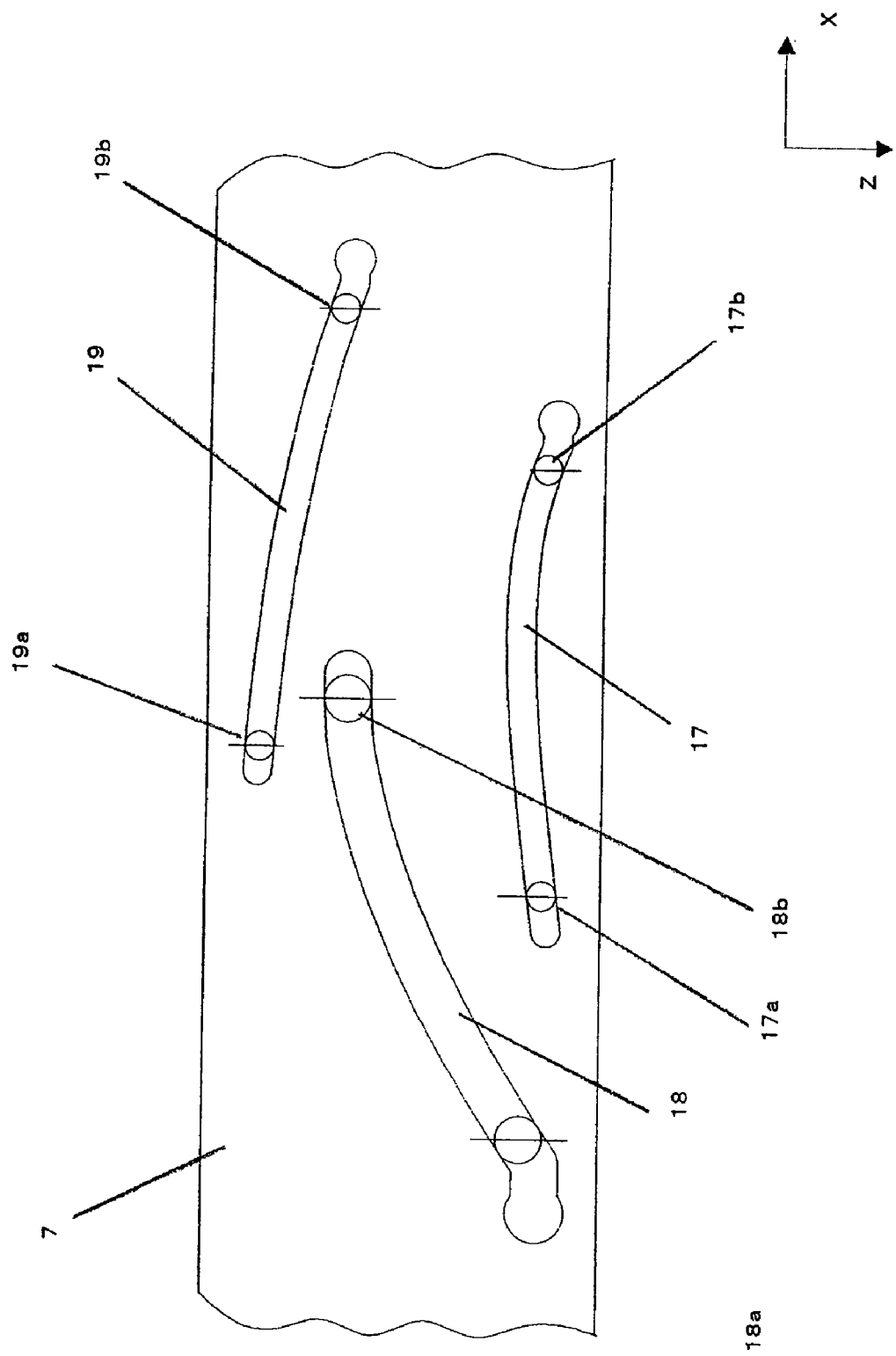
FIG. 7 is a developed view of a cam cylinder of the lens barrel in accordance with the embodiment of the present invention.

FIG. 7 is a developed view of the cam cylinder of the lens barrel in accordance with the embodiment of the present invention. In FIG. 7, the lower side of the paper corresponds to the direction of the object side of the optical axis AX (positive direction of the z-axis).

One end 17a of the cam groove 17 corresponds to a position of the wide angle end of the second lens unit L2. One end 18a of the cam groove 18 corresponds to a position of the wide angle end of the third lens unit L3. One end 19a of the cam groove 19 corresponds to a position of the wide angle end of the fourth lens unit L4.

The other end 17b of the cam groove 17 corresponds to a position of the zooming end of the second lens unit L2. The other end 18b of the cam groove 18 corresponds to a position of the zooming end of the third lens unit L3. The other end of the cam groove 19 corresponds to a position of the zooming end of the fourth lens unit L4.

Ranges of from the end 17a to the end 17b of the cam groove 17, from the end 18a to the end 18b of the cam groove 18, and from the end 18a to the end 18b of the cam groove 18 all correspond to a center angle of about 100 degrees in the outer peripheral surface of the cam cylinder 7.

The ring washer 23 is arranged between the cam cylinder 7 and the first lens unit fixing frame 3. The ring washer 23 is a plate spring having a cylindrical shape made from stainless steel. The ring washer 23 energizes the cam cylinder 7 towards the direction parallel to the optical axis AX by being compressed towards the direction parallel to the optical axis AX in a space between the cam cylinder 7 and the first lens unit fixing frame 3.

Each of the cam grooves is formed so that each of the lens unit may move according to a configuration of the imaging optical system, which has been described using FIG. 2. Hence, the second lens unit L2, the third lens unit L3, and the fourth lens unit L4 move to positions corresponding to respective focal lengths by rotating the cam cylinder 7.

The cam cylinder 7 has a cam cylinder wheel pin 20. The cam cylinder wheel pin 20 is fixed with a screw to the outer peripheral surface of the cam cylinder 7 towards the direction perpendicular to the optical axis AX. The cam cylinder wheel pin 20 projects to an outer peripheral surface of the lens unit 2 from the opening 3a formed in the first lens fixing frame 3.

Figure 8:
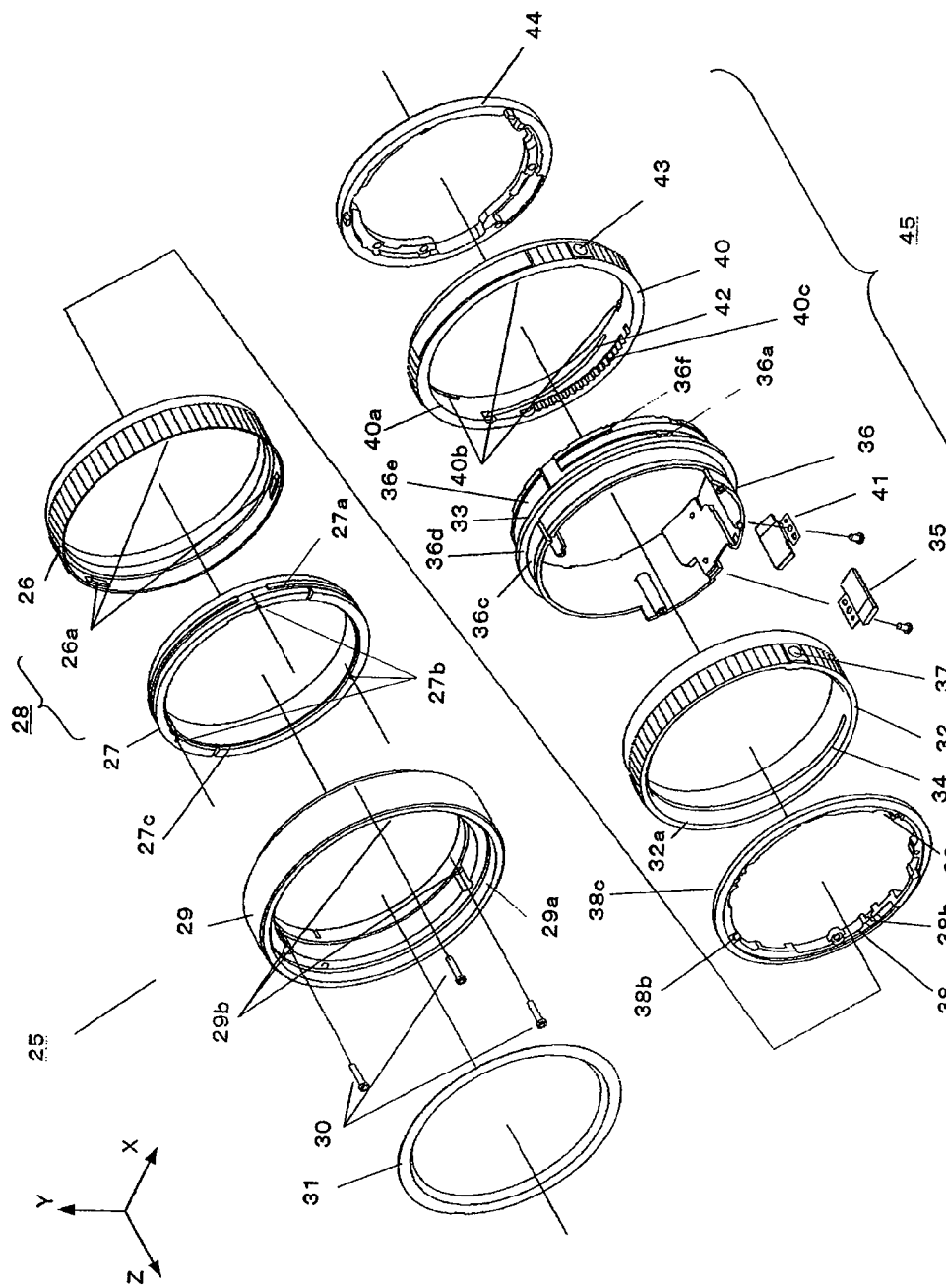
FIG. 8 is an exploded perspective view of a filter mount and a ring unit in accordance with the embodiment of the present invention.

FIG. 8 is an exploded perspective view of the filter mount and the ring unit in accordance with the embodiment of the present invention. In FIG. 3 and FIG. 8, the filter mount 29 has a cylindrical shape. In the filter mount 29, a female screw for attaching an optical filter, such as a polarizing filter, a protection filter, or the like, and a conversion lens is formed in the positive direction of the z-axis (object side).

The filter mount 29 is fixed to a first ring fixing frame 27 of a zoom ring unit 28, which will be hereinafter described, with three fixing screws 30 from the direction of the object side of the optical axis AX (positive direction of the z-axis). A decoration ring 31 is adhered with a double-faced adhesive tape from the direction of the object side of the optical axis AX (positive direction of the z-axis) so that the fixing screws 30 may not be visible from the user.

In FIG. 3 and FIG. 8, the ring unit 25 includes the zoom ring unit 28 and a manual ring unit 45. The zoom ring unit 28 has the zoom ring 26 and the first ring fixing frame 27. Both of the zoom ring 26 and the first ring fixing frame 27 are of a cylindrical shape. The zoom ring 26 has three convex portions 26a in an inner periphery. The first ring fixing frame 27 has a flange portion which has three concave portions 27a in an outer periphery, and three screw holes 27b. The three screw holes 27b are formed in an end face on the side of the positive direction of the z-axis (object side).

In a state where three convex portions 26a of the zoom ring 26, and the concave portion 27a of the first ring fixing frame 27 are aligned with each other, the zoom ring 26 is inserted in the first ring fixing frame 27 from the image side in the direction parallel to the optical axis AX (negative direction of the z-axis). Subsequently, by rotating the zoom ring 26 around the optical axis AX, the zoom ring 26 is rotatably held around the optical axis AX with respect to the first ring fixing frame 27, while being restricted to move in the direction parallel to the optical axis AX (direction of the z-axis).

Moreover, a protruding portion 26b with bifurcated shape, which is illustrated only in FIG. 3, arranged on the circumference is provided in an inner peripheral surface of the zoom ring 26. The protruding portion 26b with bifurcated shape couples with the cam cylinder wheel pin 20 which is fixed to the cam cylinder 7 so that the both sides of the cam cylinder wheel pin 20 may be inserted therein. In addition, as for the zoom ring 26, focal lengths of the imaging optical system are indicated on an outer peripheral surface thereof.

The manual ring unit 45 has a second ring fixing frame 38, the focus ring 32, a third ring fixing frame 36, the aperture ring 40, and a fourth ring fixing frame 44. The manual ring unit 45 holds other members by using the third ring fixing frame 36 as a frame. The third ring fixing frame 36 has a sliding surface 36c, a sliding surface 36e, and an end face 36d in an outer peripheral surface. Additionally, as for the third ring fixing frame 36, a locking part 36a is formed in an inner peripheral surface, and three concave portions 36f are formed in the outer peripheral surface.

The sliding surface 36c is formed in the outer peripheral surface on the object side (positive direction of the z-axis) of the third ring fixing frame 36 in the direction parallel to the optical axis AX. The sliding surface 36e is formed in the outer peripheral surface on the image side (negative direction of the z-axis) of the third ring fixing frame 36 in the direction parallel to the optical axis AX. The end face 36d is a plane parallel to the xy plane formed in a boundary between the sliding surface 36c and the sliding surface 36e.

The third ring fixing frame 36 fixes a focus linear sensor 35 and an aperture linear sensor 41 to the bottom of the outer peripheral surface. The focus linear sensor 35 and the aperture linear sensor 41 are variable resistors which are composed of the same circuit configuration as that of the zoom linear sensor 21 described previously.

The focus linear sensor 35 has a slider 35a. The slider 35a is a slider which slides on a magnetic resistance, and projects towards the outer periphery. The aperture linear sensor 41 has the slider 35a. A slider 41a is a slider which slides on a magnetic resistance, and projects towards the outer periphery.

The second ring fixing frame 38 is of a cylindrical shape. A locking part 38a, a positioning part 38b, and an end face 38c are provided in the second ring fixing frame 38.

The focus ring 32 is of a cylindrical shape. FIG. 9A is a developed view of an outer peripheral surface of the focus ring in accordance with the embodiment of the present invention, while FIG. 9B is a developed view of an inner peripheral surface of the focus ring in accordance with the embodiment of the present invention.

In FIG. 8 and FIG. 9A, object distances are indicated on the outer peripheral surface of the focus ring 32. An indication area of the object distances is divided into four areas. In FIG. 9A, an indicating portion of [0.3] to [0.6] corresponds to a macro shooting area where a manual operation of the focus ring 32 is allowed. In addition, an indicating portion of [0.6] to [∞] corresponds to a normal shooting area where the manual operation of the focus ring 32 is allowed. Moreover, an indicating portion of [AF] corresponds to the normal shooting area where the manual operation of the focus ring 32 is prevented. Furthermore, an indicating portion of [AF-Macro] corresponds to the macro shooting area where the manual operation of the focus ring 32 is prevented. In FIG. 8 and FIG. 9B, the focus ring 32 has a linear cam groove 34 in the inner peripheral surface. The cam groove 34 couples with the slider 35a of the focus linear sensor 35.

Figure 10:
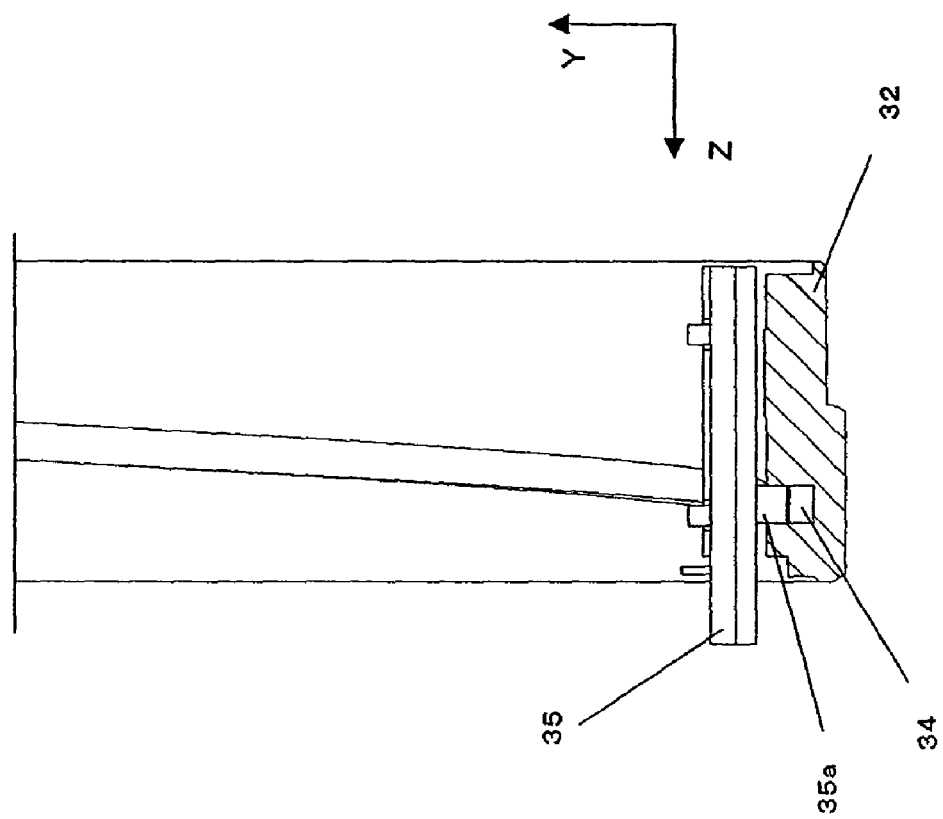
FIG. 10 is a sectional view illustrating a coupling between the focus ring and a focus linear sensor in accordance with the embodiment of the present invention.

FIG. 10 is a sectional view illustrating a coupling between the focus ring and the focus linear sensor in accordance with the embodiment of the present invention. In FIG. 10, the cam groove 34 formed in the focus ring 32 couples with the slider 35a of the focus linear sensor 35. The inner peripheral surface of the focus ring 32 is fitted into the sliding surface 36c of the third ring fixing frame 36 to thereby be held. The focus ring 32 is restricted to move in the direction parallel to the optical axis AX (direction of the z-axis) by the end face 38c of the second ring fixing frame 38, and the end face 36d of the third ring fixing frame 36. The second ring fixing frame 38 is fixed to the third ring fixing frame 36. According to this configuration, the focus ring 32 is rotatably held around the optical axis AX.

Figure 9:
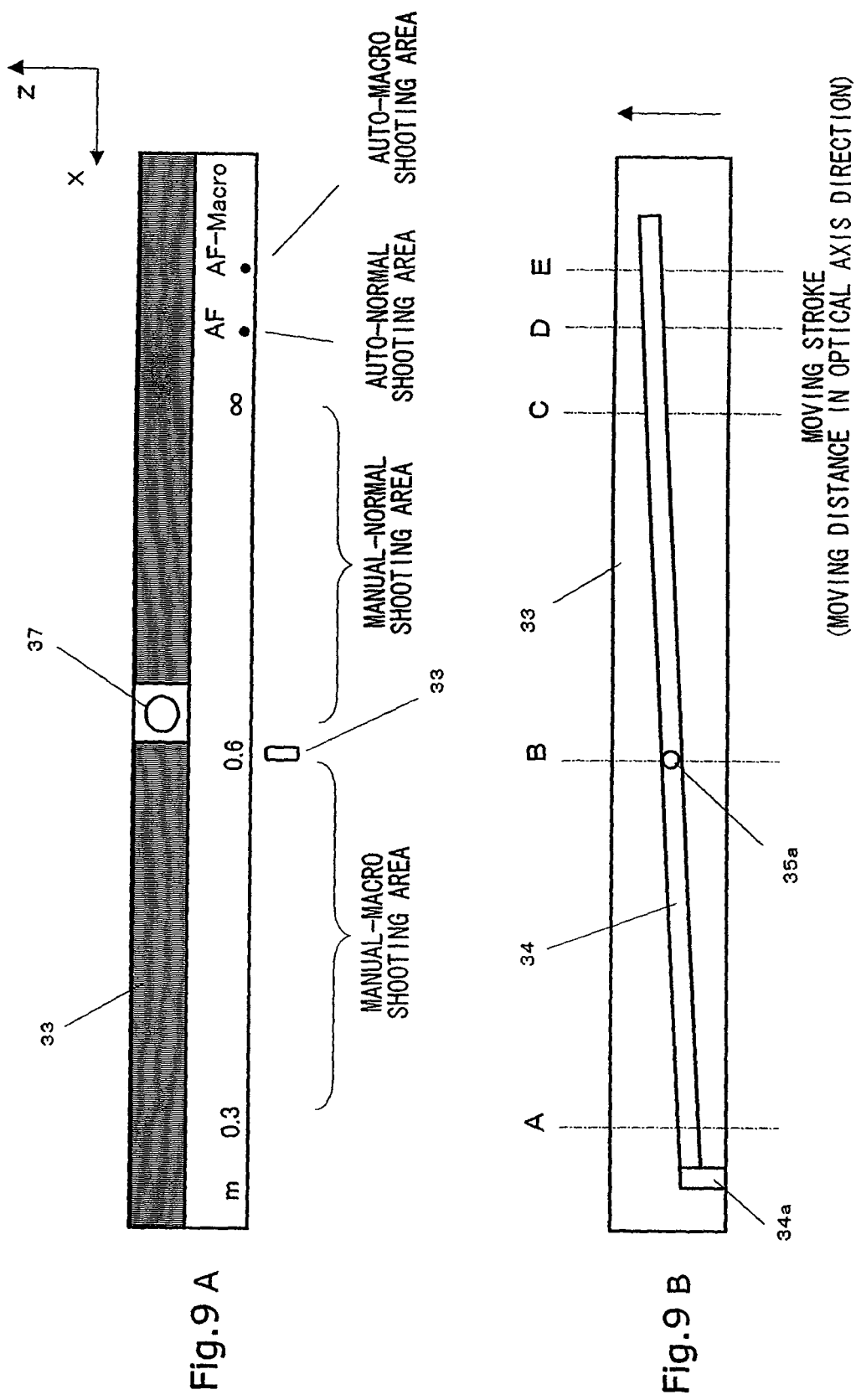
FIG. 9A is a developed view of an outer peripheral surface of the focus ring in accordance with the embodiment of the present invention.
FIG. 9B is a developed view of an inner peripheral surface of the focus ring in accordance with the embodiment of the present invention.
Figure 11:
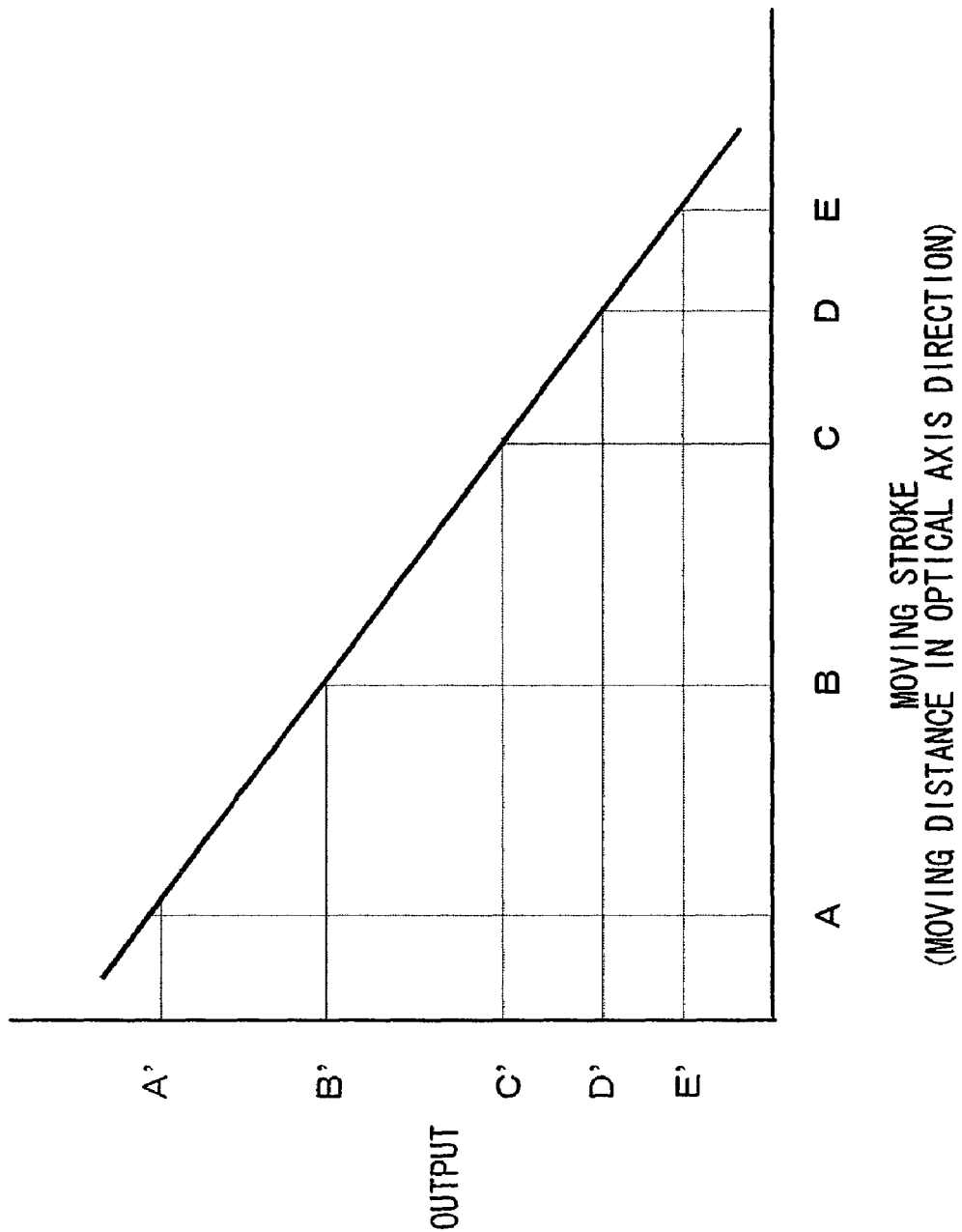
FIG. 11 is a graph showing a relation between the angle of rotation of the focus ring, and an output value of the focus linear sensor in accordance with the embodiment of the present invention.

FIG. 11 is a graph showing a relation between an angle of rotation of the focus ring, and an output value of the focus linear sensor in accordance with the embodiment of the present invention. In FIG. 9 and FIG. 10, when a character [0.3] indicated on the focus ring 32 is located in an angle coincident with the indicator 33, the slider 35a of the focus linear sensor 35 is in a position of A on the cam groove 34. In this case, the output value of the focus linear sensor 35 will be A'.

When a character [0.6] indicated on the focus ring 32 is located in the angle coincident with the indicator 33, the slider 35a of the focus linear sensor 35 is in a position of B on the cam groove 34. In that case, the output value of the focus linear sensor 35 will be B'. When a character [∞] indicated on the focus ring 32 is located in the angle coincident with the indicator 33, the slider 35a of the focus linear sensor 35 is in a position of C on the cam groove 34. In that case, the output value of the focus linear sensor 35 will be C'. When a character [AF] indicated on the focus ring 32 is located in the angle coincident with the indicator 33, the slider 35a of the focus linear sensor 35 is in a position of D on the cam groove 34. In that case, the output value of the focus linear sensor 35 will be D'. When a character [AF-Macro] indicated on the focus ring 32 is located in the angle coincident with the indicator 33, the slider 35a of the focus linear sensor 35 is in a position of E on the cam groove 34. In this case, the output value of the focus linear sensor 35 will be E'.

As described above, the focus linear sensor 35 indicates the output which corresponds one-to-one to the angle of rotation of the focus ring 32. Thus, the angle of rotation of the focus ring 32 can be detected. The focus linear sensor 35 supplies a focus position signal in accordance with the angle of rotation as a voltage change.

Figure 14:
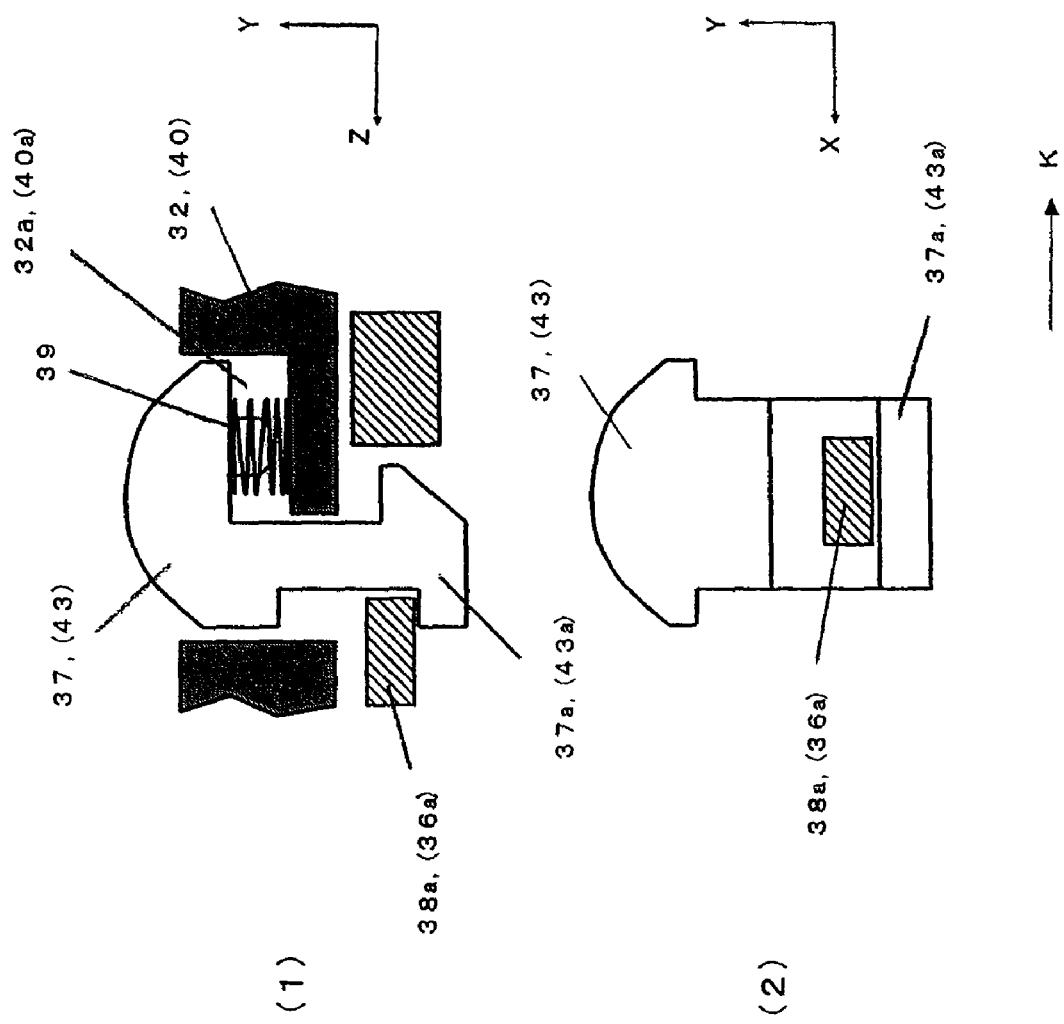
FIG. 14A is a schematic sectional view when the focus ring in accordance with the embodiment of the present invention is in a first stop position.
FIG. 14B is a schematic sectional view when the focus ring in accordance with the embodiment of the present invention is between the first stop position and a second stop position.
FIG. 14C is a schematic sectional view when the focus ring in accordance with the embodiment of the present invention is in the second stop position.
Figure 14:
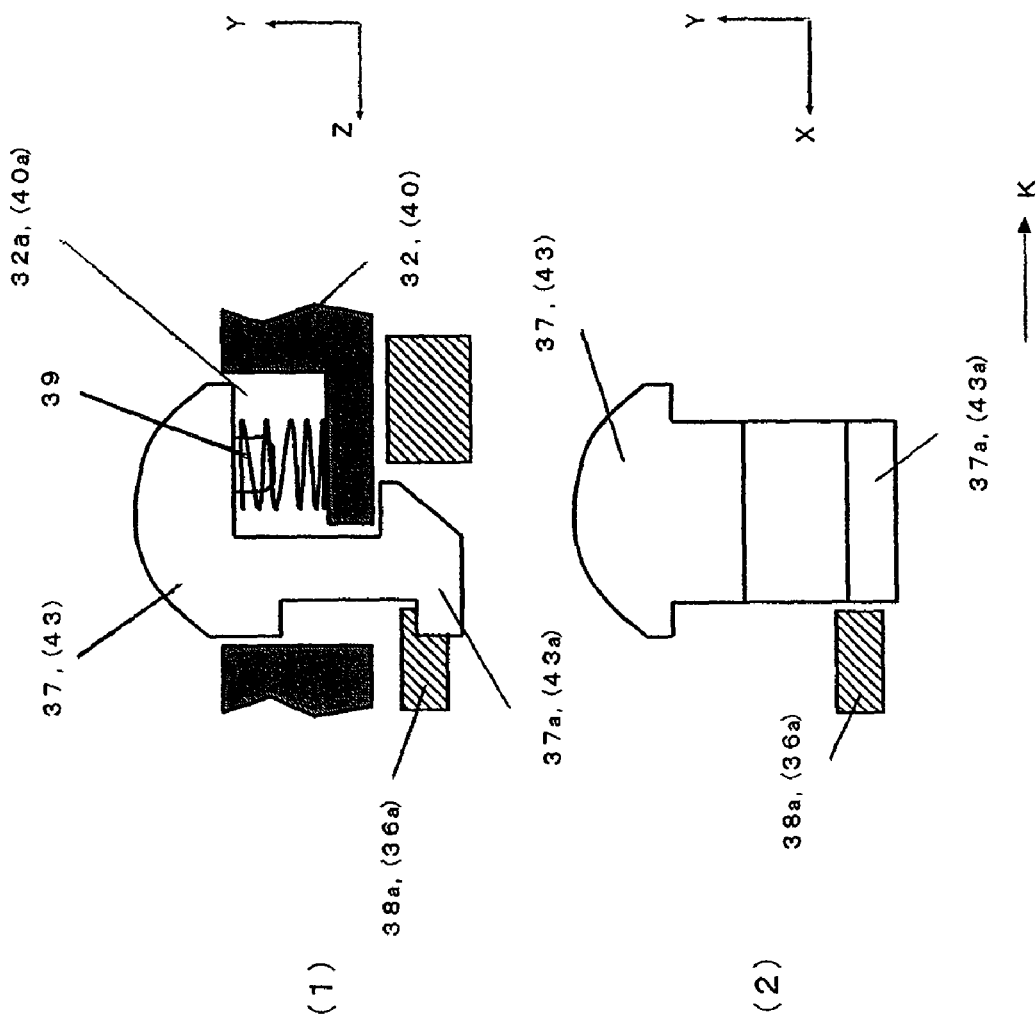

The focus ring 32 has the focus mode switching button 37 in the outer peripheral surface. FIG. 14A is a schematic sectional view when the focus ring in accordance with the embodiment of the present invention is in a first stop position. Further, FIG. 14B is a schematic sectional view when the focus ring in accordance with the embodiment of the present invention is between the first stop position and a second stop position. Still further, FIG. 14C is a schematic sectional view when the focus ring in accordance with the embodiment of the present invention is in the second stop position.

Incidentally, in the figures, reference numerals represented in parentheses correspond to the case of describing a structure of the aperture ring 40, so that these may be ignored in the description relevant to a structure of the focus ring 32. In addition, in FIG. 14A through FIG. 14C, symbol (1) is a schematic sectional view cut at a plane which passes through the center of the focus mode switching button 37 and includes the optical axis AX. Meanwhile, in FIG. 14A through FIG. 14C, symbol (2) is a schematic sectional view cut at a plane which passes through the center of the focus mode switching button 37 and is perpendicular to the optical axis AX (xy plane).

A direction shown by an arrowhead K in the figures represents a rotational direction around the optical axis AX. In the focus ring 32, the first stop position corresponds to a position of the character [∞] shown in FIG. 9A. Additionally, in the focus ring 32, the second stop position corresponds to a position of the character [AF] shown in FIG. 9A.

The focus mode switching button 37 is located in a cave 32a of the focus ring 32. There is provided a compression spring 39 between the focus mode switching button 37 and the focus ring 32. The focus mode switching button 37 is movable in directions indicated by an arrowhead J in the figures by actions of the compression spring while being energized towards the outer periphery of the focus ring 32. The focus mode switching button 37 has a locking part 37a projected in the direction of the optical axis AX, in a portion hidden inside the focus ring 32.

In FIG. 14A, when the focus ring 32 reaches the first stop position, the locking part 37a of the focus mode switching button 37 will come into contact with the locking part 38a provided in the second ring fixing frame 38. As a result, unless the focus mode switching button 37 is operated, a rotation of the focus ring 32 in a direction of K will be prevented.

When the focus ring 32 is in the first stop position, if the focus mode switching button 37 is depressed to be further rotated in the direction of K, the locking part 37a of the focus mode switching button 37 will be depressed inwardly.

A space through which the locking part 37a of the focus mode switching button 37 can pass is formed inside the locking part 38a formed in the second ring fixing frame 38. As a result, when being depressed and further rotated in the direction of K, the focus mode switching button 37 is allowed to rotate in the direction of K to advance between the first stop position and the second stop position as shown in FIG. 14B.

When the focus mode switching button 37 is further rotated in the direction of K while being depressed, the locking part 37a of the focus mode switching button 37 is allowed to rotate in the direction of K, and reaches the second stop position shown in FIG. 14C. When depressing the focus mode switching button 37 is stopped at the second stop position, the focus mode switching button 37 will be returned to an original position by the compression spring.

When the focus mode switching button 37 returns to an original state, the locking part 37a of the focus mode switching button 37 comes into contact with the locking part 38a provided in the second ring fixing frame 38. As a result, unless the focus mode switching button 37 is operated, the rotation of the focus ring 32 in a reverse direction will be prevented. In rotating in the reverse direction of the direction of K, what is necessary is to rotate the focus mode switching button 37 to the first stop position in the reverse direction of the direction of K while depressing it at the second stop position, and just to stop depressing it at the first stop position.

Figure 20:
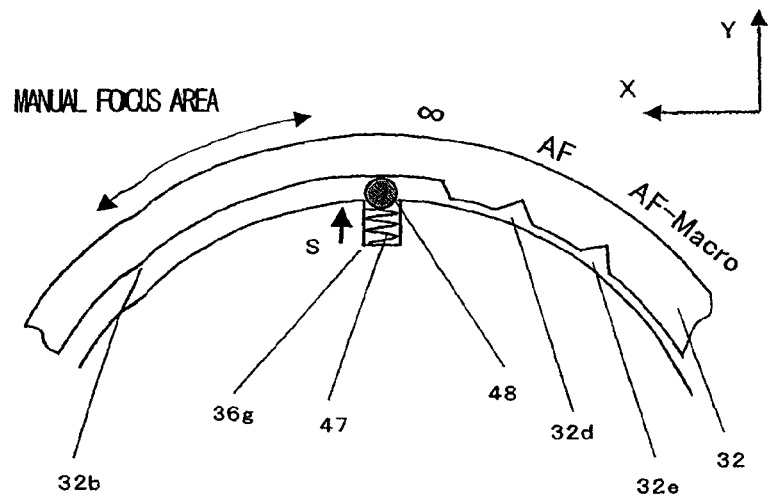
FIG. 20A is a schematic diagram explaining action by a rotating operation of the focus ring in the manual focus shooting area in accordance with the embodiment of the present invention.
FIG. 20B is a schematic diagram explaining action by the rotating operation of the focus ring in an auto focus shooting area in accordance with the embodiment of the present invention.
FIG. 20C is a schematic diagram explaining action by the rotating operation of the focus ring when a character and an indicator in accordance with the embodiment of the present invention match.
Figure 20:
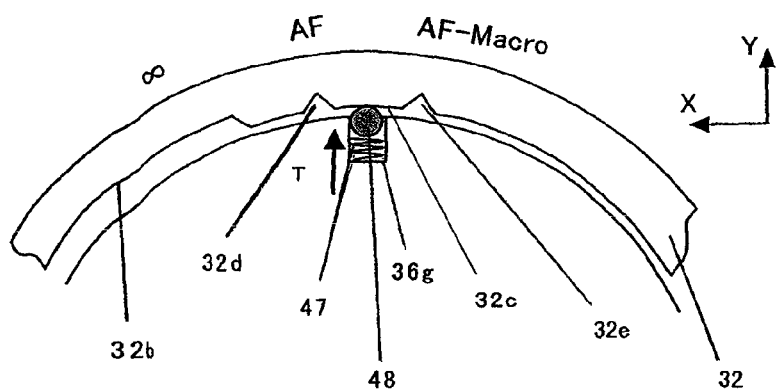

V shape grooves 32d and 32e are formed in the inner peripheral surface of the focus ring 32. FIG. 20 is a schematic diagram for explaining actions resulted from the rotating operation of the focus ring 32. In FIG. 20, the third ring fixing frame 36 is provided with a hole 36g, a click ball 48 provided in the hole 36g, and a compression spring 47 which energizes the click ball 48 in the outer peripheral direction.

In order to produce a click feeling when the character of [AF] in the case of the V shape groove 32d, and the character of [AF-Macro] in the case of the V shape groove 32e are aligned with the indicator 33, respectively, it is constituted so that the click ball 48 may be aligned with the V shape grooves 32e and 32d to thereby produce the click feeling.

In a state of a manual focus shooting area shown in FIG. 20A, an inner peripheral surface 32b provided in the focus ring 32, and the click ball 48 to which an energizing force S of the compression spring 47 is applied, move slidingly. Hence, in manually rotating the focus ring 32, it is rotated in a state where a certain load is applied.

In a state of an auto focus shooting area shown in FIG. 20B, the click ball 48 to which an energizing force T of the compression spring 47 is applied moves slidingly on an inner peripheral surface 32c provided in the focus ring 32. At this time, since a radius of the inner peripheral surface 32c is smaller than that of the inner peripheral surface 32b, the energizing force T of the compression spring 47 becomes larger than the energizing force S.

As a result, in the auto focus shooting area, in manually operating the focus ring 32 in a rotational manner, a rotational load of the auto focus shooting area becomes heavier than that of the manual focus area. Thus, the rotational load can be set differently between the manual focus shooting area and the auto focus shooting area.

Setting the rotational load differently between the manual focus shooting area and the auto focus shooting area makes it possible for the user to determine which area is being used based on the difference in the rotational load even in operating the focus ring 32 without watching it.

Figure 20C:
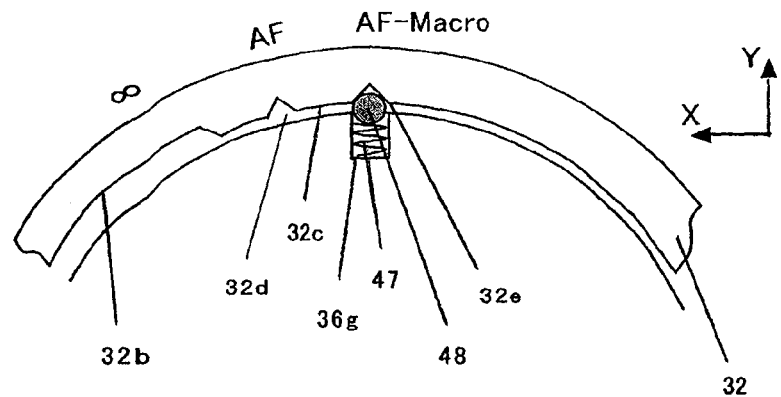

Moreover, in a state where the character [AF-Macro] and the indicator 33 are aligned with each other as shown in FIG. 20C, the click ball 48 falls in the V shape groove 32e, and similarly, in a state where the character [AF] and the indicator 33 are aligned with each other, the click ball 48 falls in the V shape groove 32d. Hence, the user can obtain a click feeling when manually operating it in a rotational manner. Moreover, as a result of increasing the rotational load during the shift between the character [AF] and the character [AF-Macro], it does not shift to a different mode, against the user's intention, resulted from the careless rotation of the focus ring 32, thus making it possible to provide the manual ring excellent in operability.

Figure 12A:
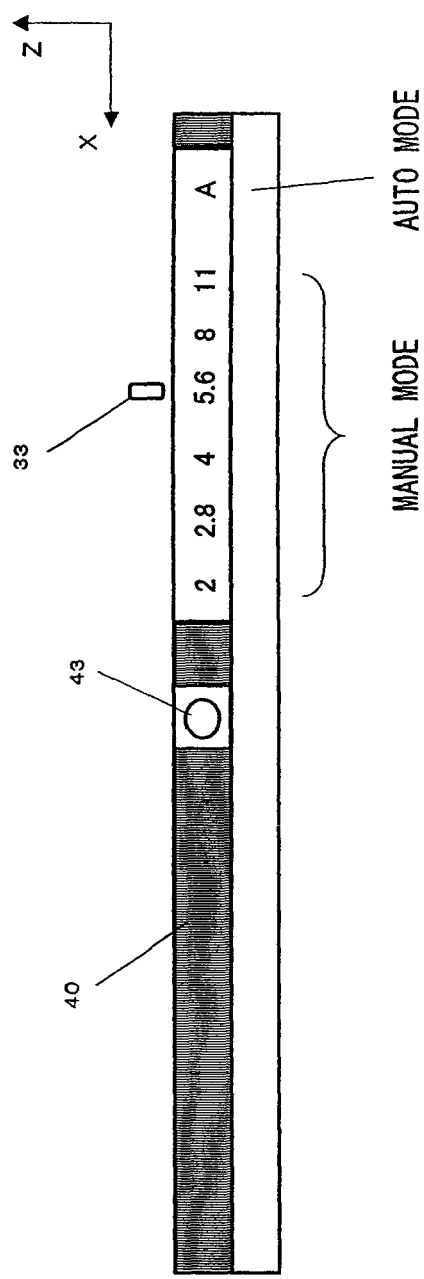
FIG. 12A is a developed view of the outer peripheral surface of the aperture ring in accordance with the embodiment of the present invention.
Figure 12B:
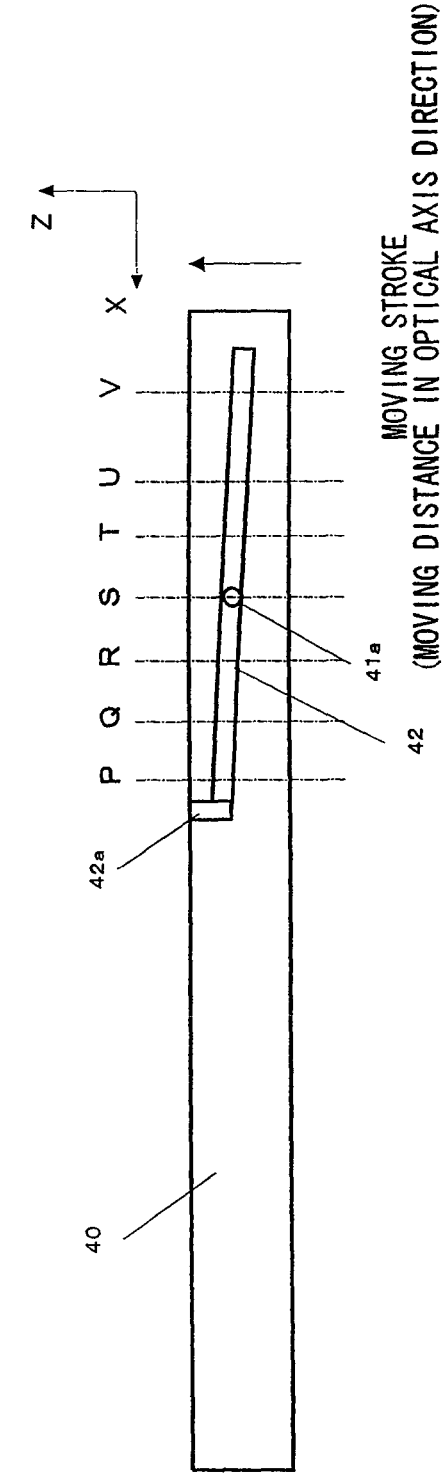
FIG. 12B is a developed view of the inner peripheral surface of the aperture ring in accordance with the embodiment of the present invention.

The aperture ring 40 is of a cylindrical shape. The aperture ring 40 has three convex portions 40b in an inner peripheral surface on the image side (negative direction of the z-axis) of the optical axis AX. FIG. 12A is a development of an outer peripheral surface of the aperture ring in accordance with the embodiment of the present invention, while FIG. 12B is a developed view of the inner peripheral surface of the aperture ring in accordance with the embodiment of the present invention. Note herein that the convex portions 40b are omitted in the development.

In FIG. 8 and FIG. 12A, the apertures are indicated on the outer peripheral surface of the aperture ring 40. The indication area of the aperture is divided into two areas. In FIG. 12A, indicating portions of [2] to [11] correspond to a manual area. Meanwhile, in FIG. 12A, an indicating portion of [A] corresponds to an auto area.

In FIG. 8 and FIG. 12B, the aperture ring 40 has a linear cam groove 42 in the inner peripheral surface. The cam groove 42 couples with the slider 41a of the aperture linear sensor 41. The inner peripheral surface of the aperture ring 40 is fitted into the sliding surface 36e of the third ring fixing frame 36 to thereby be held. The three convex portions 40b provided in the inner periphery thereof and the three concave portions 36f provided in an outer periphery of the third ring fixing frame 36 are coupled with each other to restrict the aperture ring 40 to move in the direction parallel to the optical axis AX (direction of the z-axis). According to this configuration, the aperture ring 40 is rotatably held around the optical axis AX.

Figure 13:
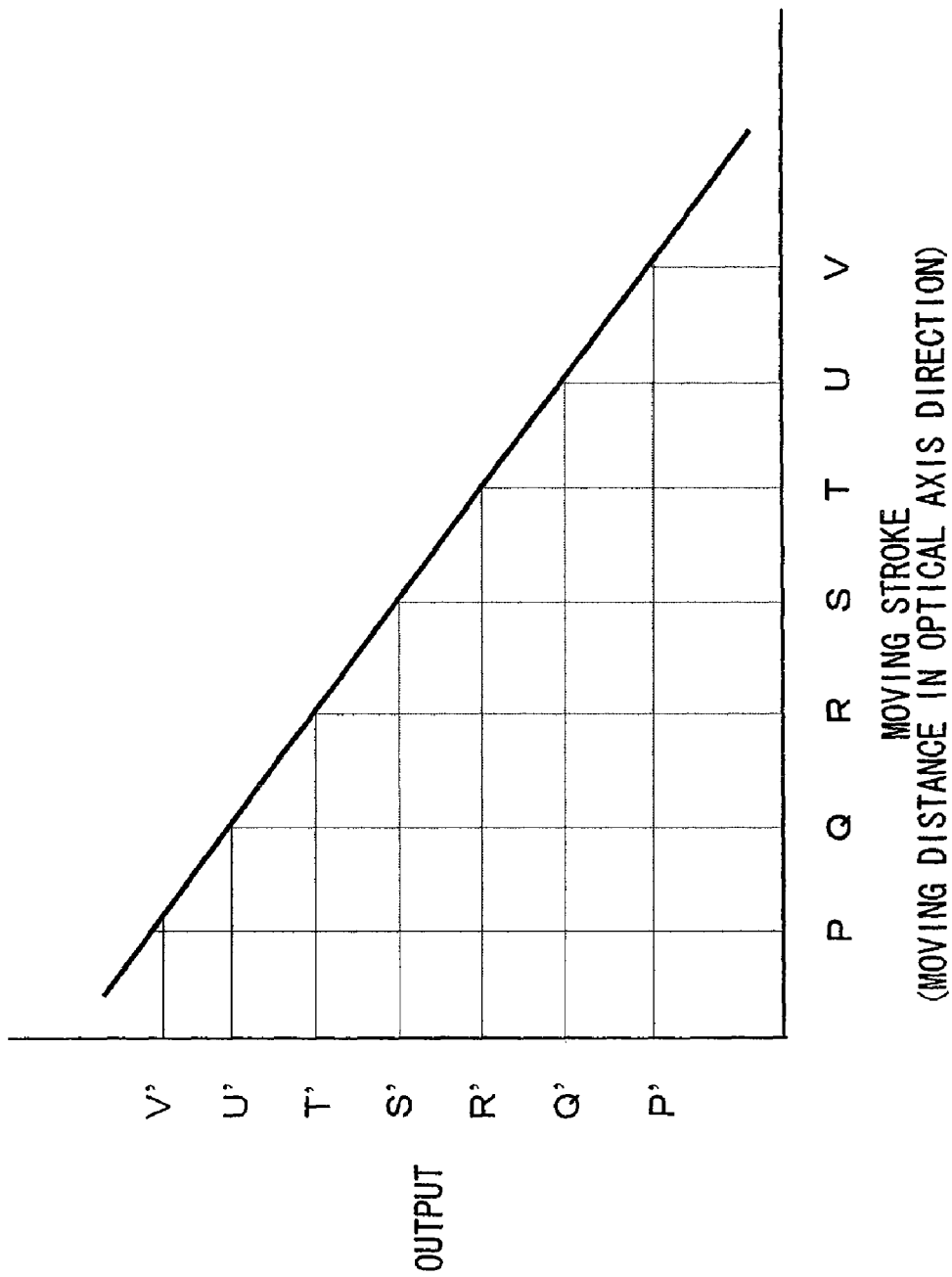
FIG. 13 is a graph showing a relation between an angle of rotation of the aperture ring, and an output value of the aperture linear sensor in accordance with the embodiment of the present invention.

FIG. 13 is a graph showing a relation between the angle of rotation of the aperture ring, and an output value of the aperture linear sensor in accordance with the embodiment of the present invention. In FIG. 12 and FIG. 13, when the character [2] indicated on the aperture ring 40 is located in the angle coincident with the indicator 33, the slider 41a of the aperture linear sensor 41 is in a position of P on the cam groove 42. In that case, the output value of the aperture linear sensor 41 will be P'.

When a character [2.8] indicated on the aperture ring 40 is located in the angle coincident with the indicator 33, the slider 41a of the aperture linear sensor 41 is in a position of Q on the cam groove 42. In that case, the output value of the aperture linear sensor 41 will be Q'. Similarly, when a character [4] indicated on the aperture ring 40 is located in the angle coincident with the indicator 33, the slider 41a of the aperture linear sensor 41 is in a position of R on the cam groove 42. In that case, the output value of the aperture linear sensor 41 will be R'. Still similarly, when a character [5.6] indicated on the aperture ring 40 is located in the angle coincident with the indicator 33, the slider 41a of the aperture linear sensor 41 is in a position of S on the cam groove 42. In that case, the output value of the aperture linear sensor 41 will be S'. Still similarly, when a character [8] indicated on the aperture ring 40 is located in the angle coincident with the indicator 33, the slider 41a of the aperture linear sensor 41 is in a position of T on the cam groove 42. In that case, the output value of the aperture linear sensor 41 will be T'. Still similarly, when a character [11] indicated on the aperture ring 40 is located in the angle coincident with the indicator 33, the slider 41a of the aperture linear sensor 41 is in a position of U on the cam groove 42. In that case, the output value of the aperture linear sensor 41 will be U'. Still similarly, when the character [A] indicated on the aperture ring 40 is located in the angle coincident with the indicator 33, the slider 41a of the aperture linear sensor 41 is in a position of V on the cam groove 42. In that case, the output value of the aperture linear sensor 41 will be V'.

As described above, the aperture linear sensor 41 indicates the output which corresponds one-to-one to the angle of rotation of the aperture ring 40. Thus, the angle of rotation of the aperture ring 40 can be detected. The aperture linear sensor 41 supplies an aperture signal in accordance with the angle of rotation as a voltage change.

The aperture ring 40 has the aperture mode switching button 43 in the outer peripheral surface. A structure of the aperture mode switching button 43 is the same as that of the focus mode switching button 37 described previously. Hence, description thereof will be made using FIG. 14A through FIG. 14B.

It should be noted herein that a first stop position in the aperture ring 40 is a position corresponding to the character [11] in FIG. 12A, whereas a second stop position in the aperture ring 40 is a position corresponding to the character [A] in FIG. 12A.

In FIG. 14A, when the aperture ring 40 reaches the first stop position, a locking part 43a of the aperture mode switching button 43 will come into contact with the locking part 36a provided in the third ring fixing frame 36. As a result, unless the aperture mode switching button 43 is operated, a rotation of the aperture ring 40 in the direction of K will be prevented.

When the aperture ring 40 is in the first stop position, if the aperture mode switching button 43 is depressed to be further rotated in the direction of K, the locking part 43a of the aperture mode switching button 43 will be depressed inwardly. A space through which the locking part 43a of the aperture mode switching button 43 can pass is formed inside the locking part 36a formed in the third ring fixing frame 36. As a result, when being depressed and further rotated in the direction of K, the aperture mode switching button 43 is allowed to rotate in the direction of K to thereby advance between the first stop position and the second stop position as shown in FIG. 14B.

When the aperture mode switching button 43 is further rotated in the direction of K while being depressed, the locking part 43a of the aperture mode switching button 43 is allowed to rotate in the direction of K, and reaches the second stop position as shown in FIG. 14C. When depressing the aperture mode switching button 43 is stopped at the second stop position, the aperture mode switching button 43 will be returned to an original position by the compression spring.

When the aperture mode switching button 43 returns to an original state, the locking part 43a of the aperture mode switching button 43 will come into contact with the locking part 36a provided in the third ring fixing frame 36. As a result, unless the aperture mode switching button 43 is operated, the rotation of the aperture ring 40 in a reverse direction will be prevented. In rotating in the reverse direction of the direction of K, what is necessary is to rotate the aperture mode switching button 43 to the first stop position in the reverse direction of the direction of K while depressing it at the second stop position, and just to stop depressing it at the first stop position.

The manual ring unit 45 is coupled with the lens unit 2 in a following manner. The inner peripheral surface of the third ring fixing frame 36 is supported by the rib 3f provided in an outer periphery of the first lens unit fixing frame 3 of the lens unit 2. The rib 3e provided in the first lens unit fixing frame 3 and the positioning part 38b provided in the second ring fixing frame come into contact with each other, so that the manual ring unit 45 is restricted to move in the direction parallel to the optical axis AX (direction of the z-axis).

Meanwhile, the fourth ring fixing frame 44 of the manual ring unit 45 is fixed to the master flange 5 with a screw. The fourth ring fixing frame 44 energizes an end face on the image side (negative direction of the z-axis) of the direction parallel to the optical axis AX of the third ring fixing frame 36 towards the object side (positive direction of the z-axis) in the direction parallel to the optical axis AX. As a result, the manual ring unit 45 is fixed to the lens unit 2.

Actions of the lens barrel 46 constituted as above will now be described.

When the zoom ring 26 is rotationally operated, rotary motion will be transmitted to the cam cylinder 7 by the cam cylinder wheel pin 20 connected with the zoom ring 26.

When the cam cylinder 7 rotates around the optical axis AX, the cam pin 8 will be guided to the cam groove 17, and the second lens moving frame 6 will move in the direction parallel to the optical axis AX. Moreover, when the cam cylinder 7 rotates around the optical axis AX, the cam pin 10 will be guided to the cam groove 18, and the third lens moving frame 9 will move in the direction parallel to the optical axis AX. Moreover, when the cam cylinder 7 rotates around the optical axis AX, the cam pin 12 will be guided to the cam groove 19, and the fourth lens moving frame 11 will move in the direction parallel to the optical axis AX.

When the third lens moving frame 9 moves in the direction parallel to the optical axis AX, the zoom linear sensor 21 will detect the movement of the third lens moving frame 9 and outputs a focal length signal. In the focus ring 32, there are states, according to a rotation position, where a manual rotating operation is allowed, and where the manual rotating operation is prevented. When the indicator 33 of the focus ring 32 is coincident with the indicating portions of [0.3] to [0.6], or the indicating portions of [0.6] to [∞] in FIG. 9A, the manual rotating operation thereof is allowed.

When the focus ring 32 is rotationally operated in a state where the rotation of the focus ring 32 is allowed, the focus linear sensor 35 will output the focus position signal according to the angle of rotation. In a control system which will be hereinafter described, the driving signal for driving the focus motor 15 is generated based on the focus position signal. The focus motor 15 is rotated by the driving signal. When the focus motor 15 rotates, rotary motion thereof will be converted into linear motion by the feed screw 15a and the rack 14a, so that the fifth lens moving frame 13 will move in the direction parallel to the optical axis AX (direction of the z-axis).

When the indicator 33 of the focus ring 32 is coincident with the indicating portion of [AF], or the indicating portion of [AF-Macro] in FIG. 9A, the manual rotation thereof is prevented. In a state where the rotation of the focus ring 32 is prevented, since the focus ring 32 does not rotate, the fifth lens moving frame 13 does not move in the direction parallel to the optical axis AX (direction of the z-axis), either. In order to shift the state where the rotation of the focus ring 32 is allowed to the state where the rotation thereof is prevented, the focus ring 32 is rotationally operated while depressing the focus mode switching button 37 provided in the focus ring 32.

When the focus ring 32 is rotationally operated while depressing the focus mode switching button 37, as described using FIG. 14A through FIG. 14C, the focus ring 32 will rotate beyond a position which is a locking position where the indicator 33 is coincident with the indication of the character [∞]. Subsequently, when the focus mode switching button 37 is released, the focus ring 32 is locked in a position which is a next locking position where the indicator 33 is coincident with the indication of the character [AF]. On the contrary, in order to shift the state where the rotation of the focus ring 32 is prevented to the state where the rotation thereof is allowed, the focus ring 32 is rotated while similarly depressing the focus mode switching button 37 provided in the focus ring 32.

When the focus ring 32 is rotationally operated while depressing the focus mode switching button 37, as described using FIG. 14A through FIG. 14C, the focus ring 32 will rotate beyond a position which is a locking position where the indicator 33 is coincident with the indication of the character [AF]. Subsequently, when the focus mode switching button 37 is released, the focus ring 32 will be in a state where the manual rotating operation is allowed. The focus ring 32, however, does not rotate beyond the position which is the locking position where the indicator 33 is coincident with the indication of the character [∞].

In the aperture ring 40, there are states, according to a rotation position, where a manual rotating operation is allowed, and where the manual rotating operation is prevented. When the indicator 33 of the aperture ring 40 is coincident with the indicating portions of [2] to [11] in FIG. 12A, the manual rotating operation thereof is allowed.

When the aperture ring 40 is rotationally operated in a state where the rotation of the aperture ring 40 is allowed, the aperture linear sensor 41 will output the aperture signal according to the angle of rotation. In the control system which will be hereinafter described, the driving signal for driving the aperture drive motor 22b is generated based on the aperture signal. The aperture drive motor 22b is rotated by the driving signal. When the aperture drive motor 22b rotates, the aperture blade is driven, and the aperture of the imaging optical system L will be changed by the operation of the aperture blade.

When the indicator 33 of the aperture ring 40 is coincident with the indicating portion of [A] in FIG. 12A, the manual rotating operation thereof is prevented. In a state where the rotation of the aperture ring 40 is prevented, since the aperture ring 40 does not rotate, the aperture blade is driven by the manual rotating operation, and the aperture is not changed. In order to shift the state where the rotation of the aperture ring 40 is allowed to the state where the rotation thereof is prevented, the aperture ring 40 is rotated while depressing the aperture mode switching button 43 provided in the aperture ring 40.

When the aperture ring 40 is rotated while depressing the aperture mode switching button 43, as described using FIG. 14A through FIG. 14C, the aperture ring 40 will rotate beyond a position which is a locking position where the indicator 33 is coincident with the indication of the character [11]. Subsequently, when the aperture mode switching button 43 is released, the aperture ring 40 is locked in a position which is a next locking position where the indicator 33 is coincident with the indication of the character [A].

On the contrary, in order to shift the state where the rotation of the aperture ring 40 is prevented to the state where the rotation thereof is allowed, the aperture ring 40 is rotated while similarly depressing the aperture mode switching button 43 provided in the aperture ring 40.

When the aperture ring 40 is rotated while depressing the aperture mode switching button 43, as described using FIG. 14A through 14C, the aperture ring 40 will rotate beyond a position which is a locking position where the indicator 33 is coincident with the indication of the character [A]. Subsequently, when the aperture mode switching button 43 is released, the aperture ring 40 will be in a state where the manual rotating operation is allowed. The aperture ring 40, however, does not rotate beyond the position which is the locking position where the indicator 33 is coincident with the indication of the character [11].

Meanwhile, a V shape groove line 40c is formed in the inner peripheral surface of the aperture ring 40 so that the user may have the click feeling when the characters of [2.8], [4], [5.6], [8], [11], and [A] are coincident with the indicator 33. Moreover, a hole 36h for housing a compression spring and a click ball (neither is shown) is provided in the outer periphery of the third ring fixing frame 36 so as to correspond to the V shape groove line 40c. These actions are similar to the operation between the V shape groove 32d and the V shape groove 32e of the focus ring 32, and the click ball 48, which has been described previously using FIG. 20.

Figure 15:
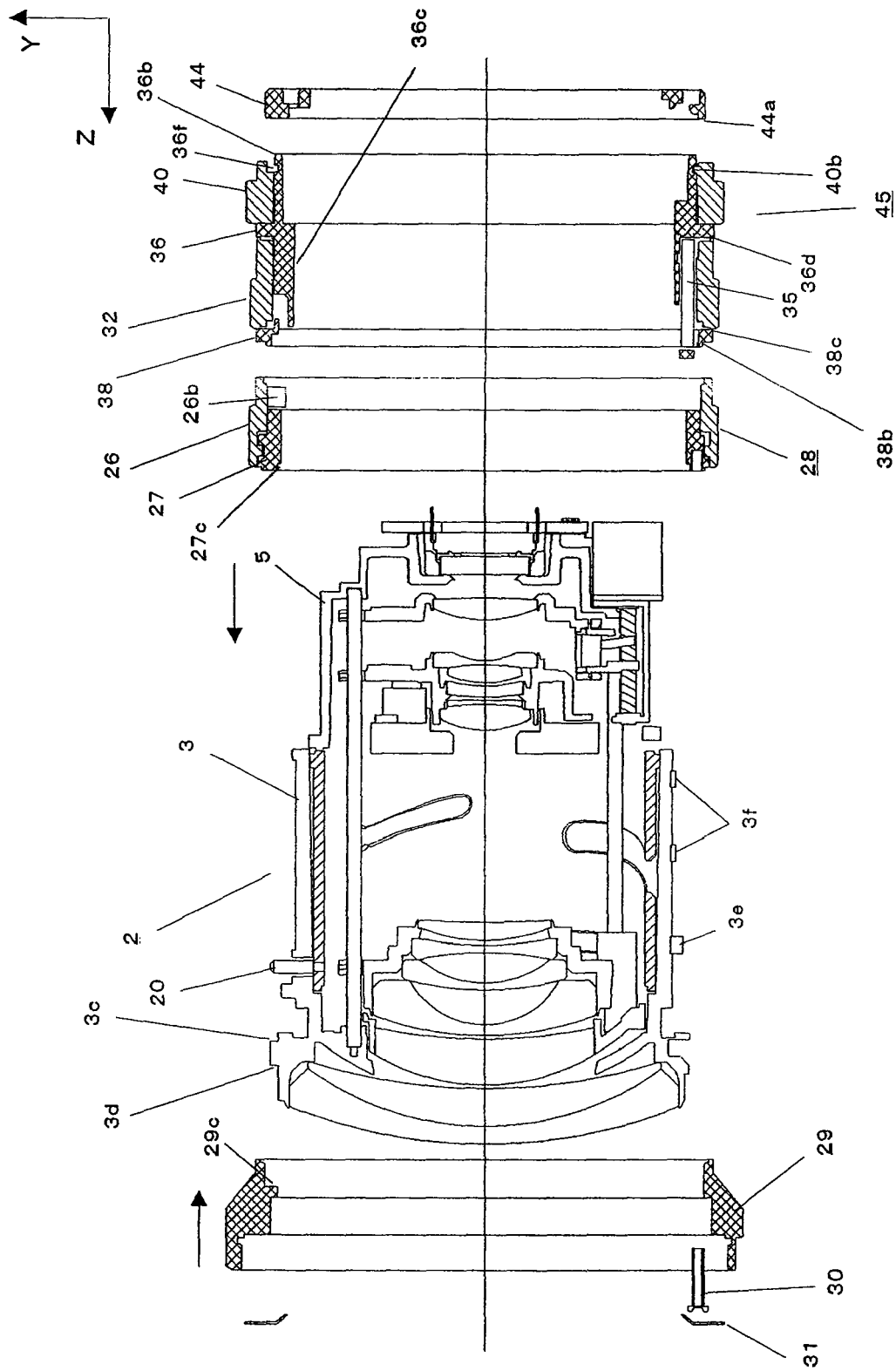
FIG. 15 is a sectional view explaining an assembly method of the lens barrel in accordance with the embodiment of the present invention.
Figure 16:
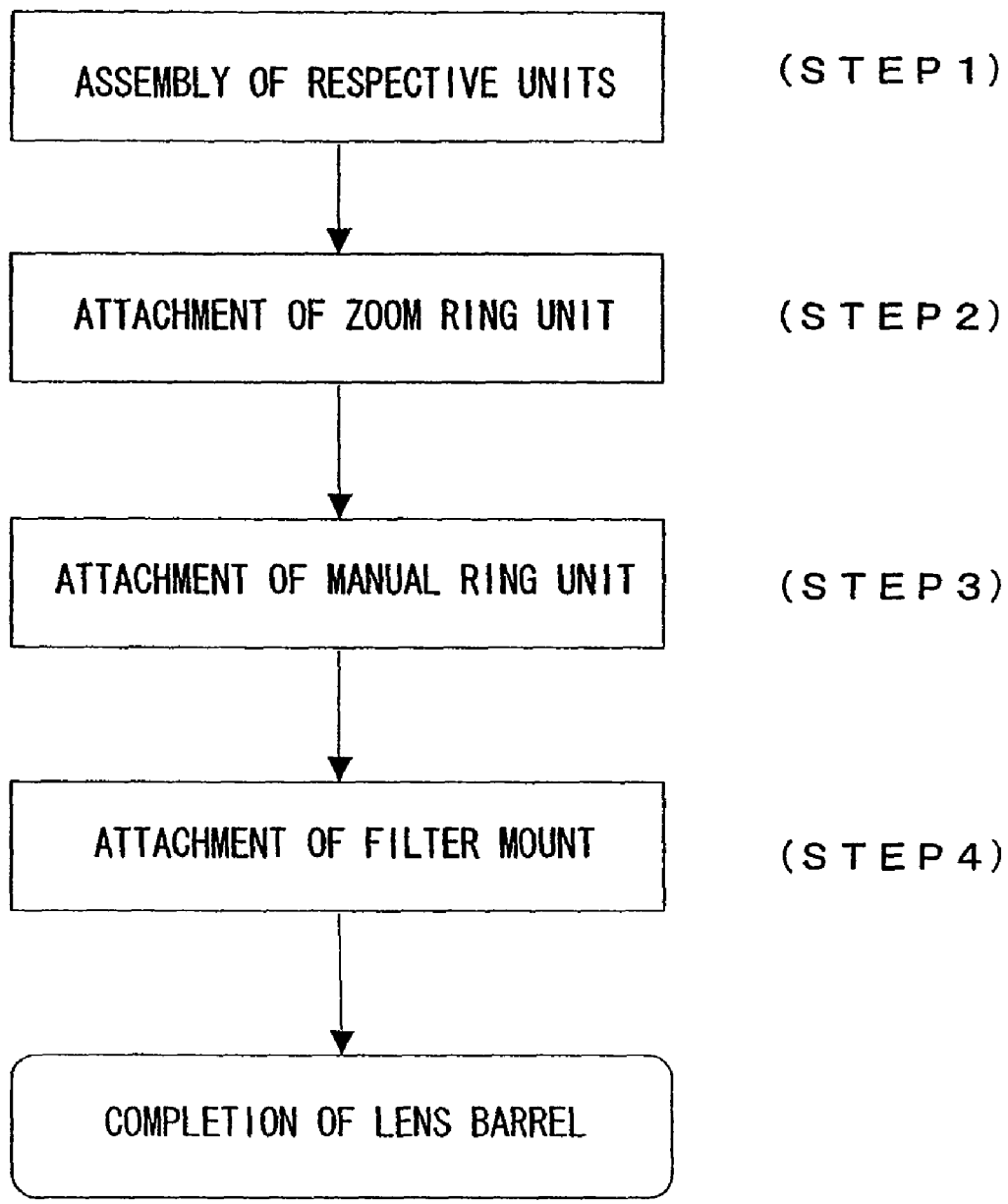
FIG. 16 is a flow chart for explaining the assembly method of the lens barrel in accordance with the embodiment of the present invention.

Next, an assembly method of the lens barrel 46 in accordance with the embodiment of the present invention will be described. FIG. 15 is a sectional view explaining the assembly method of the lens barrel in accordance with the embodiment of the present invention. FIG. 16 is a flow chart for explaining the assembly method of the lens barrel in accordance with the embodiment of the present invention.

The lens barrel 46 is assembled according to the steps of assembly of respective units (STEP1), attachment of the zoom ring unit 28 (STEP2), attachment of the manual ring unit 45 (STEP3) and attachment of the filter mount 29 (STEP4).

First, the lens unit 2, the zoom ring unit 28, and the manual ring unit 45 are assembled (STEP1). Hereinafter, an assembly method particularly of the zoom ring unit 28 and the manual ring unit 45 will be described.

The zoom ring unit 28 is assembled in a following manner. In a state where three convex portions 26a of the zoom ring 26, and the concave portion 27a of the first ring fixing frame 27 are aligned with each other, the zoom ring 26 is coupled with the first ring fixing frame 27 from the image side in the direction parallel to the optical axis AX (negative direction of the z-axis). According to this configuration, the zoom ring 26 rotates with respect to the first ring fixing frame 27. The zoom ring unit 28 is assembled in the manner described above.

The manual ring unit 45 is assembled in a following manner. First, the focus linear sensor 35 and the aperture linear sensor 41 are fixed to third ring frame 36 with a screw from the outer peripheral surface in a predetermined position. The focus ring 32 is inserted in the third ring fixing frame 36 from the object side (positive direction of the z-axis) in the direction parallel to the optical axis AX. Upon inserting the focus ring 32, the slider 35a of the focus linear sensor 35 is inserted along with a fluting 34a. The flutings 34a are formed in the inner peripheral surface of the focus ring 32 following to an end of the cam groove 34 in the direction parallel to the optical axis AX (direction of the z-axis). When the focus ring 32 is inserted in the third ring fixing frame 36, a sliding surface of the inner periphery of the focus ring 32, and the sliding surfaces 36c provided in the outer periphery of third ring fixing frame 36 are slidingly fitted to each other, so that the focus ring 32 will become rotatable with respect to the center of the optical axis.

After inserting the focus ring 32, the second ring fixing frame 38 is fixed to the third ring fixing frame 36 with a screw from the object side (positive direction of the z-axis) parallel to the optical axis AX. As a result of being fixed, the focus ring 32 is restricted to move in the direction parallel to the optical axis AX (direction of the z-axis) by the end face 36d of the third ring fixing frame 36, and the end face 38c of the second fixing ring. Next, the aperture ring 40 is inserted in the third ring fixing frame 36 from the image side (negative direction of the z-axis) parallel to the optical axis AX. Upon inserting the aperture ring 40, the slider 41a of the aperture linear sensor 41 is inserted along with a fluting 42a. The flutings 42a are formed in the inner peripheral surface of the aperture ring 40 following to an end of the cam groove 42 in the direction parallel to the optical axis AX (direction of the z-axis). When the aperture ring 40 is inserted in the third ring fixing frame 36, a sliding surface 40a of the inner periphery of the aperture ring 40, and the sliding surfaces 36c provided in the outer periphery of third fixing ring 36 are slidingly fitted to each other, so that the aperture ring 40 will become rotatable with respect to the center of the optical axis.

Simultaneously, the three convex portions 40b provided in the inner periphery of the aperture ring 40, and the three concave portions 36f provided in the outer periphery of the third ring fixing frame 36 are coupled with each other to thereby restrict the aperture ring 40 to move in a thrust direction. As a result of coupling them together, it is restricted to move in the direction parallel to the optical axis AX (direction of the z-axis). The manual ring unit 45 is assembled in the manner described above (foregoing processes are including in STEP1).

Next, the assembled zoom ring unit 28 is attached to the lens unit 2 (STEP2). The assembled zoom ring unit 28 is inserted in the lens unit 2 from the image side (negative direction of the z-axis) in the direction parallel to the optical axis AX. At this time, it is inserted until a positioning part 27c of the first ring fixing frame 27 comes into contact with the rib 3c of the first lens unit fixing frame 3. Both sides of the cam cylinder wheel pin 20 are disposed between the protruding portions 26b with bifurcated shape provided in the inner periphery of the zoom ring 26, and are coupled together. The zoom ring unit 28 is attached to the lens unit 2 in the manner as described above (foregoing processes are included in STEP2).

Next, the assembled manual ring unit 45 is attached to the lens unit 2 (STEP3). The assembled manual ring unit 45 is inserted in the lens unit 2 from the image side (negative direction of the z-axis) in the direction parallel to the optical axis AX. At this time, it is inserted until the positioning part 38b formed in the second ring fixing frame 38 of the manual ring unit 45 comes into contact with the rib 3e provided in the first lens unit fixing frame 3. At this time, the inner periphery of the third ring fixing frame 36 is supported by a plurality of positioning ribs 3f provided in the outer periphery of the first lens unit fixing frame 3. Further, the fourth ring fixing frame 44 is inserted in the lens unit 2 from the image side (negative direction of the z-axis) in the direction parallel to the optical axis AX. The fourth ring fixing frame 44 is fixed to the master flange 5 with a screw from the image side (negative direction of the z-axis) in the direction parallel to the optical axis AX. At this time, an end face 36b on the image side (negative direction of the z-axis) in the direction parallel to the optical axis AX of third ring fixing frame 36 is in contact with an end face 44a on the object side (positive direction of the z-axis) in the direction parallel to the optical axis AX of the fourth ring fixing frame 44 (foregoing processes are included in STEP3).

Finally, the filter mount 29 is attached to the lens unit 2 (STEP4). The filter mount 29 is attached to the lens unit 2 from the object side (positive direction of the z-axis) in the direction parallel to the optical axis AX. The filter mount 29 is inserted until an end face 29c thereof comes into contact with the rib 3d provided in the first lens unit fixing frame 3. The filter mount 29 is attached to the first ring fixing frame 27 so as for the ribs 3d and 3e to be disposed therebetween. The filter mount 29 is fixed to the first ring fixing frame 27 with the screw 30. Next, the decoration ring 31 is fixed to the filter mount 29 with the double-faced adhesive tape. The screw 30 is hidden by attaching the decoration ring 31, As a result, external beauties of the digital camera are increased (foregoing processes are included in STEP4).

As described above, according to the imaging device of the present invention, it is possible to evaluate the imaging optical system without decomposing the imaging optical system of the lens unit even before the ring unit is attached. Moreover, even if the ring unit is damaged or deteriorated, the ring units can be exchanged without decomposing the imaging optical system.

Moreover, according to the imaging device of the present invention, since the filter mount is attachable and detachable in a state where the imaging optical system of the lens unit can form the optical image of the object, even if the filter mount is damaged or deteriorated, the filter mount can be exchanged without decomposing the imaging optical system.

Moreover, according to the assembly method of the lens barrel of the present invention, since there is a process of assembling the ring unit after a process of assembling the lens unit, it is possible to evaluate the imaging optical system even before the ring unit is attached.

Moreover, according to the assembly method of the lens barrel of the present invention, since there is a process of assembling the filter mount after the process of assembling the lens unit, it is possible to evaluate the imaging optical system even before the filter mount is attached.

Moreover, since the lens barrel 46 in accordance with the embodiment of the present invention is provided with the focus ring 32 which is manually operated in a rotational manner in order to move the fifth lens unit L5, and the focus mode switching button 37 integrally provided in the focus ring 32, the user does not need to take a hand off from the focus ring 32 when changing the focus mode. Thus, it is possible to provide the lens barrel excellent in operability for the user.

Since the lens barrel 46 in accordance with the embodiment of the present invention is provided with the focus ring 32 which is manually operated in a rotational manner in order to move the focus lens unit, and the focus mode switching button 37 integrally provided in the focus ring 32, the focus mode setting and the manual focusing can be made only by the operation of the focus ring 32. Thus, it is possible to provide the lens barrel excellent in operability for the user.

In the lens barrel 46 in accordance with the embodiment of the present invention, since the output of the focus linear sensor 35 changes corresponding to the angle of rotation of the focus ring 32, the rotating operation of the focus ring 32 serves two functions, namely, a function as an operating member for performing manual focusing; and a function as a switch for switching the focus mode. Thus, it is possible to provide the lens barrel excellent in operability for the user. Moreover, since it also serves as the switch, a reduction in parts can be achieved.

In the lens barrel 46 in accordance with the embodiment of the present invention, the focus ring 32 has a range where the manual rotation is allowed, and a specific position where the manual rotation is prevented, and has a stop position in rotating from the range where the manual rotation is allowed to the specific position where the manual rotation prevented. The lens barrel 46 in accordance with the embodiment of the present invention does not rotate from the range where the manual rotation is allowed to the specific position where the manual rotation is prevented unless the focus mode switching button 37 is operated in this stop position, so that it may not be accidentally operated.

Moreover, since the lens barrel 46 in accordance with the embodiment of the present invention is provided with the aperture ring 40 which is manually operated in a rotational manner in order to change the aperture, and the aperture mode switching button 43 integrally provided in the aperture ring 40, the user does not need to take a hand off from the aperture ring 40 when changing an aperture mode among exposure setting modes. Thus, it is possible to provide the lens barrel excellent inoperability for the user.

Since the lens barrel 46 in accordance with the embodiment of the present invention is provided with the aperture ring 40 which is manually operated in a rotational manner in order to drive the aperture stop 22, and the aperture mode switching button 43 integrally provided in the aperture ring 40, a setting of the aperture mode and a manual change of the aperture can be made only by the operation of the aperture ring 40. Thus, it is possible to provide the lens barrel excellent in operability for the user.

In the lens barrel 46 in accordance with the embodiment of the present invention, since the output of the aperture linear sensor 41 changes corresponding to the angle of rotation of the aperture ring 40, the rotating operation of the aperture ring 40 serves two functions, namely, the function as the operating member for manually setting the aperture, and a function as a switch for switching the aperture mode. Thus, it is possible to provide the lens barrel excellent in operability for the user. Moreover, since it also serves as the switch, a reduction in parts can be achieved.

Moreover, in the lens barrel 46 in accordance with the embodiment of the present invention, the aperture ring 40 has a range where the manual rotation is allowed, and a specific position where the manual rotation prevented, and has a stop position in rotating from the range where the manual rotation is allowed to the specific position where the manual rotation prevented. The lens barrel 46 in accordance with the embodiment of the present invention does not rotate from the range where the manual rotation is allowed to the specific position where the manual rotation is prevented unless the aperture mode switching button 43 is operated in this stop position, so that it may not be accidentally operated.

Figure 17:
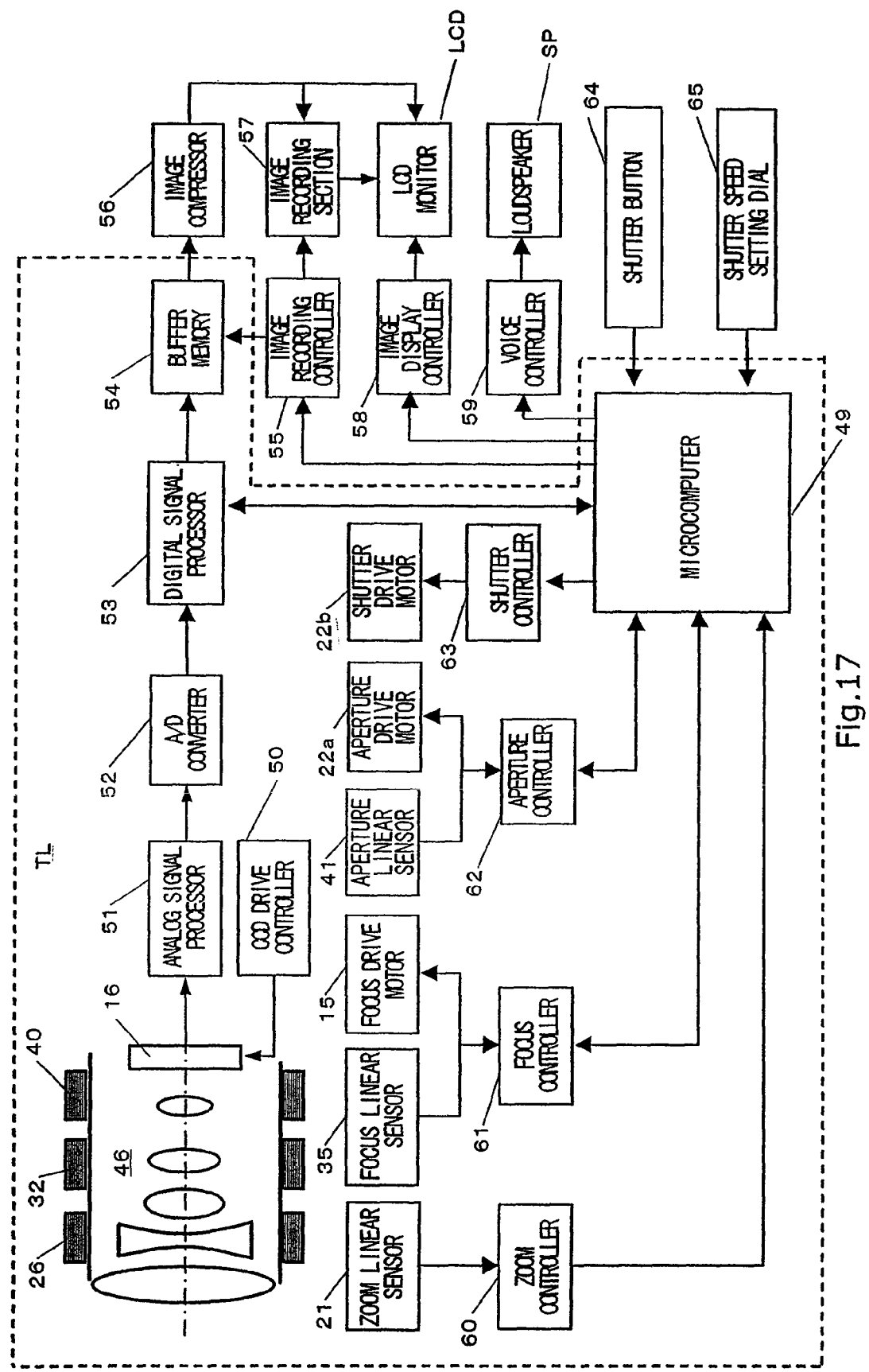
FIG. 17 is a block diagram illustrating a control system of the digital camera in accordance with the embodiment of the present invention.

FIG. 17 is a block diagram illustrating the control system of the digital camera in accordance with the embodiment of the present invention. In FIG. 17, a whole block shows a control of the digital camera 1. Note herein that in FIG. 17, a range surrounded by the dotted line represents the imaging device TL. The microcomputer 49, which controls whole various controllers, is incorporated in the digital camera 1.

The microcomputer 49 can receive signals from a zoom controller 60, the shutter button 64, and the shutter speed setting dial 65. The microcomputer 49 can send signals to a shutter controller 63, an image recording controller 55, an image display controller 58, and a voice controller 59. The microcomputer 49 can exchange signals with a focus controller 61, an aperture controller 62, and a digital signal processor 53.

The zoom controller 60 receives a signal from the zoom linear sensor 21. The zoom controller 60 converts the amount of rotation of the zoom ring 26 detected by the zoom linear sensor 21 into focal length information of the imaging optical system L. The zoom controller 60 transmits the focal length information to the microcomputer 49.

The focus controller 61 can receive a signal from the focus linear sensor 35, and send a signal to a focus drive motor 15. The focus controller 61 determines the focus mode from the angle of rotation of the focus ring 32 detected by the focus linear sensor 35. The focus controller 61 transmits a determined result to the microcomputer 49. The focus controller 61 transmits object distance information detected from the angle of rotation of the focus ring 32 based on the instruction from the microcomputer 49, to the microcomputer 49. The focus controller 61 drives the focus motor 15 based on the control signal from the microcomputer 49.

The aperture controller 62 can receive a signal from the aperture linear sensor 41, and send a signal to the aperture drive motor 22b. The aperture controller 62 determines the aperture mode based on the angle of rotation of the aperture ring 40 detected by the aperture linear sensor 41. The aperture controller 62 transmits a determined result to the microcomputer 49. The aperture controller 62 transmits aperture information detected from the angle of rotation of the aperture ring 40 based on the instruction from the microcomputer 49, to the microcomputer 49. The aperture controller 62 drives the aperture drive motor 22b based on the control signal from the microcomputer 49.

The shutter controller 63 drives the shutter drive motor 22a based on the control signal from the microcomputer 49. The shutter button 64 transmits the shutter timing to the microcomputer 49. The shutter speed setting dial 65 transmits shutter speed information and shutter mode information being set.

The image sensor 16 is a CCD (Charge Coupled Device). The image sensor 16 converts the optical image formed by the imaging optical system L of the lens unit 2 into the electrical image signal. The image sensor 16 is driven and controlled by a CCD drive controller 50. The image signal outputted by the image sensor 16 is processed in order by an analog signal processor 51, an A/D converter 52, the digital signal processor 53, a buffer memory 54, and an image compressor 56.

The image signal is transmitted to the analog signal processor 51 from the image sensor 16. The analog signal processor 51 subjects the image signal which the image sensor 16 outputs to analog signal processing, such as gamma processing or the like. The image signal is transmitted to the A/D converter 52 from the analog signal processor 51. The A/D converter 52 converts the analog image signal outputted by the analog signal processor 51 into a digital signal.

The image signal is transmitted to the digital signal processor 53 from the A/D converter 52. The digital signal processor 53 performs digital signal processing, such as noise rejection and edge enhancement of the image signal which is converted into the digital signal by the A/D converter 52. The image signal is transmitted to the buffer memory 54 from the digital signal processor 53. The buffer memory 54 once stores the image signal processed by the digital signal processor 53. The buffer memory 54 is a RAM (Random Access Memory).

The image signal is transmitted from the buffer memory 54 to the image compressor 56 according to an instruction from the image recording controller 55. The image compressor 56 compresses data of the image signal into a predetermined data size according to the instruction of the image recording controller 55. The image signal is subjected to data compression at a predetermined ratio, resulting in a data size smaller than the original data size. As this compression technique, for example, a JPEG (Joint Photographic Experts Group) technique may be employed.

From the image compressor 56, a compressed image signal is transmitted to the image recording section 57 and the liquid crystal monitor LCD. Meanwhile, the microcomputer 49 transmits the control signals to the image recording controller 55 and the image display controller 58. The image recording controller 55 controls the image recording section 57 based on the control signal from the microcomputer 49. The image display controller controls the liquid crystal monitor LCD based on the control signal from the microcomputer 49.

The image recording section 57 records the image signal on an internal memory and/or or a removable memory based on the instruction of the image recording controller 55. The image recording section 57 records information which should be stored with the image signal on the internal memory and/or the removable memory based on the instruction of the image recording controller 55. The information which should be stored with the image signal includes time and date, focal length information, shutter speed information, aperture information, and shooting mode information at the time of shooting the image. It is, for example, an Exif (registered trademark) format or a format similar to the Exif (registered trademark) format.

The liquid crystal monitor LCD displays the image signal as a visible image based on an instruction of the image display controller 58. The liquid crystal monitor LCD displays information which should be displayed with the image signal based on the instruction of the image display controller 58. The information which should be displayed with the image signal includes displays of focal length information, shutter speed information, aperture information, shooting mode information, and focused state information. The microcomputer 49 also transmits the control signal to the voice controller 59. The voice controller 59 drives and controls the loudspeaker SP based on the control signal from the microcomputer 49. The loudspeaker SP sounds predetermined alarm sounds to the outside.

Hereinafter, focus operation of the digital camera 1 will be described using FIG. 17. The digital camera 1 has four focus modes, namely, an auto-normal shooting mode for automatically focusing to the normal shooting area, an auto-macro shooting mode for automatically focusing to a close-up shooting area, a manual-normal shooting mode for manually focusing to the normal shooting area, and a manual-macro shooting mode for manually focusing to the close-up shooting area.

The user who operates the digital camera 1 can select any one of the four focus modes by setting the focus ring 32 to a desired angle of rotation. In other words, upon aligning the indicator 33 with the character [AF] of the focus ring 32, the user can set the auto-normal shooting mode. Upon aligning the indicator 33 with the character [AF-Macro] of the focus ring 32, the user can set the auto-macro shooting mode. Upon aligning the indicator 33 with the range of the characters [0.6] through [∞] of the focus ring 32, the user can set the manual-normal shooting mode. Upon aligning the indicator 33 with the range of the characters [0.6] through [0.3] of the focus ring 32, the user can set the manual-macro shooting mode.

Hereinafter, among four focus modes, the auto-normal shooting mode and the auto-macro shooting mode are generically called an auto focus mode. Meanwhile, hereinafter, the manual-normal shooting mode and the manual-macro shooting mode are generically called a manual focus mode. The focus linear sensor 35 outputs a signal in accordance with the angle of rotation to the focus controller 61.

When it is in a state where the indicator 33 is aligned with the character [AF] or [AF-Macro] of the focus ring 32, the focus controller 61 determines, based on the signal received from the focus linear sensor 35, that the focus mode is in the auto focus mode. A determined result is transmitted to the microcomputer 49.

The microcomputer 49 recognizes that it is in the auto focus mode based on the determined result received from the focus controller 61. The microcomputer 49 transmits the control signal to the focus controller 61, and drives the focus drive motor 15 to thereby slightly move the fifth lens unit L5.

The microcomputer 49 transmits an instruction to the digital signal processor 53. The digital signal processor 53 transmits the image signal to the microcomputer 49 at predetermined timings based on the received instruction. Based on the received image signal and the focal length information received from the zoom controller 60 in advance, the microcomputer 49 calculates a moving distance in the direction parallel to the optical axis AX of the focus ring 32 where the imaging optical system L will be in the focused state. The microcomputer 49 generates a control signal based on an operation result. The microcomputer 49 transmits the control signal to the focus controller 61.

The microcomputer 49 also transmits the control signal to the image display controller 58. The image display controller 58 drives the liquid crystal monitor LCD. The liquid crystal monitor LCD displays that the focus mode is in the auto focus mode. The microcomputer 49 also transmits the control signal to the voice controller 59. The voice controller 59 generates an audio signal to drive the loudspeaker SP. The loudspeaker SP sounds an alarm sound noticing that the focus mode is in the auto focus mode.

The focus controller 61 generates the driving signal for driving the focus drive motor 15 based on the control signal from the microcomputer 49. The focus motor 15 is driven based on the driving signal. The fifth lens unit L5 is driven by the focus motor 15 to automatically move in the direction parallel to the optical axis AX (z-axis).

In the manner as described above, focusing in the auto focus mode of the digital camera 1 is performed. The foregoing operation is instantly performed after the user operates the shutter button 64.

After the shooting is completed, the microcomputer 49 transmits the control signal to the image recording controller 55. The image recording section 57 records the image signal on the internal memory and/or the removable memory based on the instruction of the image recording controller 55. The image recording section 57 records, based on the instruction of the image recording controller 55, the information indicating that the shooting mode is in the auto focus mode on the internal memory and/or the removable memory with the image signal.

When it is in a state where the indicator 33 is aligned with the range of the characters [0.3] through [∞] of the focus ring 32, the focus controller 61 determines that the focus mode is in the manual focus mode. A determined result is transmitted to the microcomputer 49.

The microcomputer 49 requests the object distance information detected from the angle of rotation of the focus ring 32 to the focus controller 61. The focus controller 61 transmits the object distance information detected from the angle of rotation of the focus ring 32 based on the instruction from the microcomputer 49, to the microcomputer 49. The microcomputer 49 recognizes that it is in the manual focus mode based on the determined result received from the focus controller 61. The microcomputer 49 generates the control signal for moving the fifth lens unit L5 based on the object distance information detected from the angle of rotation of the focus ring 32. The microcomputer 49 transmits the generated control signal to the focus controller 61.

The microcomputer 49 also transmits the control signal to the image display controller 58. The image display controller 58 drives the liquid crystal monitor LCD. The liquid crystal monitor LCD displays that the focus mode is in the manual focus mode. The microcomputer 49 also transmits the control signal to the voice controller 59. The voice controller 59 generates the audio signal set in advance in the case of the manual focus mode to transmit it to the loudspeaker SP. The loudspeaker SP sounds an alarm sound according to the audio signal.

The focus controller 61 generates the driving signal for driving the focus drive motor 15 based on the control signal from the microcomputer 49. The focus motor 15 is driven based on the driving signal. The fifth lens unit L5 is driven by the focus motor 15 to move in the direction parallel to the optical axis AX (z-axis) according to the amount of rotation of the focus ring 32.

In the manner as described above, focusing in the manual focus mode of the digital camera 1 is performed. The user can rotate the focus ring 32 to perform the focusing while confirming the object on the liquid crystal monitor LCD. In the manual focusing mode, when the user operates the shutter button, shooting is performed as it is.

After the shooting is completed, the microcomputer 49 transmits the control signal to the image recording controller 55. The image recording section 57 records the image signal on the internal memory and/or the removable memory based on the instruction of the image recording controller 55. The image recording section 57 records, based on the instruction of the image recording controller 55, the information indicating that the shooting mode is in the manual focus mode on the internal memory and/or or the removable memory with the image signal.

Next, an exposure setting operation of the digital camera 1 will be described using FIG. 17. The digital camera 1 has four exposure setting modes, namely, a program shooting mode for automatically setting the exposure to the normal shooting area, a shutter speed priority shooting mode for manually setting the shutter speed, an aperture priority shooting mode for manually setting the aperture, and a manual shooting mode for manually setting both of the shutter speed and the aperture.

The user who operates the digital camera 1 can select any one of the four exposure setting modes by setting the aperture ring 40 while combining a predetermined angle of rotation thereof with the angle of rotation of the shutter speed setting dial 65. In other words, when setting the shutter speed setting dial 65 to the auto-position in a state where the character [A] of the aperture ring 40 is aligned with the indicator 33, the user can set the program shooting mode. When setting the shutter speed setting dial 65 to a position where the manual setting can be made in the state where the character [A] of the aperture ring 40 is aligned with the indicator 33, the user can set the shutter speed priority shooting mode. When setting the shutter speed setting dial 65 to the auto-position in a state where a position between the characters [2] through [11] of the aperture ring 40 is aligned with the indicator 33, the user can set the aperture priority shooting mode. When setting the shutter speed setting dial 65 to the position where the manual setting can be made in the state where the position between the characters [2] through [11] of the aperture ring 40 is aligned with the indicator 33, the user can set the manual shooting mode.

Hereinafter, among the four exposure setting modes, the program shooting mode and the shutter speed priority shooting mode are generically called an auto aperture mode. Meanwhile, hereinafter, the aperture priority shooting mode and the manual shooting mode are generically called a manual aperture mode.

The aperture linear sensor 41 outputs a signal in accordance with the angle of rotation to the aperture controller 62. When it is in the state where the character [A] of the aperture ring 40 is aligned with the indicator 33, if the shutter button 64 is operated, the aperture controller 62 determines, based on the signal received from the aperture linear sensor 41, that the exposure setting mode is in the auto aperture mode. A determined result is transmitted to the microcomputer 49.

Moreover, the shutter speed setting dial 65 outputs a signal in accordance with the angle of rotation to the microcomputer 49. The Microcomputer 49 recognizes that the exposure setting mode is in the auto aperture mode based on the determination result received from the aperture controller 62 and the signal from the shutter speed setting dial 65.

The microcomputer 49 transmits the instruction to the digital signal processor 53. The digital signal processor 53 transmits the image signal to the microcomputer 49 at predetermined timings based on the received instruction. The microcomputer 49 calculates an exposure value based on the received image signal. When the exposure setting mode is in the program shooting mode, the microcomputer 49 calculates a suitable combination from the apertures and the shutter speeds which can be adjusted. When the exposure setting mode is in the shutter speed priority shooting mode, the microcomputer 49 calculates a suitable aperture for the shutter speed being set.

The microcomputer 49 generates a control signal based on an operation result. The microcomputer 49 transmits the control signal based on the calculated aperture to the aperture controller 62. When the exposure setting mode is in the program shooting mode, the microcomputer 49 transmits a control signal based on a calculated shutter speed to the shutter controller 63. When the exposure setting mode is in the shutter speed priority shooting mode, the microcomputer 49 transmits contents of the shutter speed set by the shutter speed setting dial 65, to the shutter controller 63.

The microcomputer 49 also transmits the control signal to the image display controller 58. The image display controller 58 drives the liquid crystal monitor LCD. When the control signal includes contents for instructing a program setting mode, the liquid crystal monitor LCD displays that the exposure setting mode is in the program shooting mode. When the control signal includes contents for instructing the shutter priority mode, the liquid crystal monitor LCD displays that the exposure setting mode is in the shutter speed priority mode. The microcomputer 49 also transmits the control signal to the voice controller 59. The voice controller 59 generates the audio signal to drive the loudspeaker SP. When the exposure mode is changed, the loudspeaker SP sounds an alarm sound.

The aperture controller 62 generates a driving signal for driving the aperture drive motor 22a based on the control signal from the microcomputer 49. The aperture drive motor 22a is driven based on the driving signal. The aperture blade is driven resulted from the drive of the aperture drive motor 22b.

The shutter controller 63 generates a driving signal for driving the shutter drive motor 22b based on the control signal from the microcomputer 49. The shutter drive motor 22b is driven based on the driving signal. The shutter blade is driven resulted from the drive of the shutter drive motor 22b.

In the manner as described above, exposure setting in the auto aperture mode of the digital camera 1 is performed. The foregoing operation is instantly performed after the user operates the shutter button 64.

After the shooting is completed, the microcomputer 49 transmits the control signal to the image recording controller 55. The image recording section 57 records the image signal on the internal memory and/or the removable memory based on the instruction of the image recording controller 55.

When the control signal includes contents for instructing the program setting mode, the image recording section 57 records information indicating that the exposure setting mode is in the program shooting mode, on the internal memory and/or the removable memory with the image signal, based on the instruction of the image recording controller 55. When the control signal includes contents for instructing the shutter priority mode, the image recording section 57 records information indicating that the exposure setting mode is in the shutter speed priority mode, on the internal memory and/or or the removable memory with the image signal based on the instruction of the image recording controller 55.

When it is in the state where the position between the characters [2] through [11] of the aperture ring 40 is aligned with the indicator 33, if the shutter button 64 is operated, the aperture controller 62 determines, based on the signal received from the aperture linear sensor 41, that the exposure setting mode is in the manual aperture mode. A determined result is transmitted to the microcomputer 49. Moreover, the shutter speed setting dial 65 outputs a signal in accordance with the angle of rotation to the microcomputer 49.

The microcomputer 49 recognizes, based on the determination result received from the aperture controller 62 and the signal from the shutter speed setting dial 65, that the exposure setting mode is in the manual aperture mode.

The microcomputer 49 requests the aperture information detected from the angle of rotation of the aperture ring 40 to the aperture controller 62. Based on the instruction from the microcomputer 49, the aperture controller 62 transmits the aperture information detected from the angle of rotation of the aperture ring 40 to the microcomputer 49. When the exposure setting mode is in the aperture priority shooting mode, the microcomputer 49 transmits the instruction to the digital signal processor 53. The digital signal processor 53 transmits the image signal to the microcomputer 49 at predetermined timings based on the received instruction.

When the exposure setting mode is in the aperture priority shooting mode, the microcomputer 49 calculates a shutter speed based on the received image signal. When the exposure setting mode is in the aperture priority shooting mode, the microcomputer 49 calculates a suitable shutter speed for the detected aperture. When the exposure setting mode is in the aperture priority shooting mode, the microcomputer 49 generates a control signal based on an operation result. When the exposure setting mode is in the aperture priority shooting mode, the microcomputer 49 transmits the control signal based on a calculated shutter speed to the shutter controller 63. When the exposure setting mode is in the manual shooting mode, the microcomputer 49 transmits contents of the shutter speed set by the shutter speed setting dial 65, to the shutter controller 63.

The microcomputer 49 also transmits the control signal to the image display controller 58. The image display controller 58 drives the liquid crystal monitor LCD. When the control signal includes contents for instructing the aperture priority shooting mode, the liquid crystal monitor LCD displays that the exposure setting mode is in the aperture priority shooting mode. When the control signal includes contents for instructing the manual shooting mode, the liquid crystal monitor LCD displays that the exposure setting mode is in the manual shooting mode. The microcomputer 49 also transmits the control signal to the voice controller 59. The voice controller 59 generates the audio signal to drive the loudspeaker SP. When the exposure mode is changed, the loudspeaker SP sounds the alarm sound.

The aperture controller 62 generates the driving signal for driving the aperture drive motor 22a based on the control signal from the microcomputer 49. The aperture drive motor 22a is driven based on the driving signal. The aperture blade is driven resulted from the drive of the aperture drive motor 22a. The shutter controller 63 generates the driving signal for driving the shutter drive motor 22b based on the control signal from the microcomputer 49. The shutter drive motor 22b is driven based on the driving signal. The shutter blade is driven resulted from the drive of the shutter drive motor 22b.

In the manner as described above, the exposure setting in the manual aperture mode of the digital camera 1 is performed. The foregoing operation is instantly performed after the user operates the shutter button 64.

After the shooting is completed, the microcomputer 49 transmits the control signal to the image recording controller 55. The image recording section 57 records the image signal on the internal memory and/or or the removable memory based on the instruction of the image recording controller 55.

When the control signal includes contents for instructing the aperture priority mode, the image recording section 57 records the information indicating that the exposure setting mode is in the aperture priority mode, on the internal memory and/or the removable memory with the image signal based on the instruction of the image recording controller 55. When the control signal includes contents for instructing the manual shooting mode, the image recording section 57 records the information indicating that the exposure setting mode is in the manual shooting mode, on the internal memory and/or or the removable memory with the image signal based on the instruction of the image recording controller 55.

As described above, the imaging device TL in accordance with the embodiment of the present invention is provided with a following configuration, that is, (1) a lens barrel (lens barrel 46) including the imaging optical system L for forming the optical image of the object, (2) an image sensor (image sensor 16) for converting the optical image formed by the imaging optical system L into the electrical image signal, and (3) control means (microcomputer 49).

Meanwhile, (2) the lens barrel includes a following configuration, that is, (2a) a focus lens unit (fifth lens unit L5) which is included in the imaging optical system and capable of changing the object distance by moving in the direction parallel to the optical axis of the imaging optical system, (2b) moving means (feed screw 15a and rack 14a) for moving the focus lens unit in the direction parallel to the optical axis, (2c) driving means (focus motor 15) for driving the moving means based on the control signal, (2d) a first operating member (focus ring 32) which is of a cylindrical shape coaxial to the optical axis of the imaging optical system and manually operated in a rotational manner, (2e) a second operating member (focus mode switching button 37) which is integrally provided in the first operating member, and operated in order to switch between the state of allowing the manual rotating operation of the first operating member (focus ring 32) and the state of preventing the manual rotating operation, and (2f) angle of rotation detecting means (focus linear sensor 35) for outputting a signal in accordance with the angle of rotation of the first operating member (focus ring 32). Moreover, (3) the control means perform a following operation.

(3a) When the first operating member (focus ring 32) is rotationally operated in a state where the rotating operation of the first operating member (focus ring 32) is allowed by the operation of the second operating member (focus mode switching button 37), the control means generates the control signal for moving the focus lens unit (fifth lens unit L5) based on the signal outputted by the angle of rotation detecting means (focus linear sensor 35).

Since the imaging device TL in accordance with the embodiment of the present invention is provided particularly with the focus ring 32, and the focus mode switching button 37 integrally provided in the focus ring 32, the user does not need to take a hand off from the focus ring 32 when changing the focus mode. Thus, it is possible to provide the imaging device excellent in operability for the user.

In the imaging device TL in accordance with the embodiment of the present invention, since the output of the focus linear sensor 35 changes corresponding to the angle of rotation of the focus ring 32, the rotating operation of the focus ring 32 serves two functions, namely, a function as an operating member for performing manual focusing, and a function as a switch for switching the focus mode. Thus, it is possible to provide the imaging device excellent in operability for the user. Moreover, since it also serves as the switch, a reduction in parts can be achieved.

In the imaging device TL in accordance with the embodiment of the present invention, since the focus ring 32, and the fifth lens unit L5 which is the focus lens unit are not mechanically connected, the user can rotate the focus ring 32 with a small torque in performing manual focusing. Thus, it is possible to provide the imaging device excellent in operability for the user.

In the imaging device TL in accordance with the embodiment of the present invention, since the focus ring 32, and the fifth lens unit L5 which is the focus lens unit are not mechanically connected, the user can rotate the focus ring 32 with a small torque. Meanwhile, when it has any other operating member, such as a zoom ring or the like, which is mechanically connected with the imaging optical system, the user needs to rotate the zoom ring with a larger torque compared with the focus ring 32. As a result, in manually operating the ring in a rotational manner, the user can distinguish which ring is being rotationally operated based on the torque.

In addition to the foregoing configuration, the imaging device TL in accordance with the embodiment of the present invention is provided with a following configuration, that is, (4) operation means for calculating the defocus amount of the imaging optical system (microcomputer 49).

Moreover, (3) in addition to foregoing contents, the control means (microcomputer 49) performs a following operation. When the operation start is instructed (ON of the shutter button 64) in the state where the rotating operation of the first operating member (focus ring 32) is prevented by the operation of the second operating member (focus mode switching button 37), the control means generates the control signal for moving the focus lens unit based on the operation result of the operation means.

In the imaging device TL in accordance with the embodiment of the present invention, since the focus ring 32, and the fifth lens unit L5 that is the focus lens unit are not mechanically connected, the focus ring 32 does not rotate in the auto focus mode where the aforementioned control is performed by the microcomputer 49. Thus, it is possible to provide the imaging device excellent in operability for the user.

Moreover, as described above, the imaging device TL in accordance with the embodiment of the present invention is provided with a following configuration, that is (1) a lens barrel (lens barrel 46) including the imaging optical system L for forming the optical image of the object, (2) an image sensor (image sensor 16) for converting the optical image formed by the imaging optical system L into the electrical image signal, and (3) control means (microcomputer 49).

Moreover, (2) the lens barrel (lens barrel 46) includes a following configuration, that is (2a) an aperture stop (aperture stop 22) which is provided in the specified position on the optical axis of the imaging optical system and capable of changing the aperture of the imaging optical system, (2b) driving means (aperture drive motor 22b) for operating the aperture stop based on the control signal, (2c) a first operating member (aperture ring 40) which is of a cylindrical shape coaxial to the optical axis of the imaging optical system and manually operated in a rotational manner in order to drive the driving means to thereby change the aperture of the aperture stop, (2d) a second operating member (aperture mode switching button 43) which is integrally provided in the first operating member, and operated in order to switch between the state of allowing the manual rotating operation of the first operating member (focus ring 32) and the state of preventing the manual rotating operation, and (2e) angle of rotation detecting means (aperture linear sensor 41) for outputting the signal in accordance with the angle of rotation of the first operating member.

Moreover, (3) the control means performs a following operation.

(3a) When the first operating member (aperture ring 40) is rotationally operated in a state where the rotating operation of the first operating member (aperture ring 40) is allowed by the operation of the second operating member (aperture mode switching button 43), the control means generates the control signal for changing the aperture of the aperture stop based on the signal outputted by the angle of rotation detecting means (aperture linear sensor 41).

Since the imaging device TL in accordance with the embodiment of the present invention is provided particularly with the aperture ring 40, and the aperture mode switching button 43 integrally provided in the aperture ring 40, the user does not need to take a hand off from the aperture ring 40 when changing the aperture among exposure settings. Thus, it is possible to provide the imaging device excellent in operability for the user.

In the imaging device TL in accordance with the embodiment of the present invention, since the output of the aperture linear sensor 41 changes corresponding to the angle of rotation of the aperture ring 40, the rotating operation of the aperture ring 40 serves two functions, namely, the function as the operating member for manually setting the aperture, and the function as the switch for switching the aperture among the exposure settings. Thus, it is possible to provide the imaging device excellent in operability for the user. Moreover, since it also serves as the switch, a reduction in parts can be achieved.

In the imaging device TL in accordance with the embodiment of the present invention, since the aperture ring 40 and the aperture stop 22 are not mechanically connected, the user can rotate the aperture ring 40 with a small torque in manually setting the aperture. Thus, it is possible to provide the imaging device excellent in operability for the user.

In addition to the foregoing configuration, the imaging device TL in accordance with the embodiment of the present invention is provided with a following configuration, that is (4) photometry means (image sensor 16) for detecting a quantity of light, and (5) operation means (microcomputer 49) for calculating the aperture of the imaging optical system based on a detection result of the photometry means.

Moreover, (3) in addition to the foregoing contents, the control means (microcomputer 49) performs a following operation. When the operation start is instructed in the state where the rotating operation of the first operating member (aperture ring 40) is prevented by the operation of the second operating member (aperture mode switching button 43), the control means generates the control signal for changing the aperture of the aperture stop based on an operation result of the operation means (microcomputer 49).

In the imaging device TL in accordance with the embodiment of the present invention, since the aperture ring 40 and the aperture stop 22 are not mechanically connected, when it is in the auto aperture mode where the aforementioned control is performed by the microcomputer 49, the aperture ring 40 does not rotate. Thus, it is possible to provide the imaging device excellent in operability for the user.

In addition to the foregoing configuration, the imaging device TL in accordance with the embodiment of the present invention is provided with a following configuration, that is (4) photometry means (image sensor 16) for measuring a quantity of light, (6) shutter speed setting means (shutter speed setting dial 65) for setting the shutter speed, and (5) operation means (microcomputer 49) for calculating the aperture of the imaging optical system based on a detection result of the photometry means and a setting by the shutter speed setting means.

Moreover, (3) in addition to the foregoing contents, the control means (microcomputer 49) performs a following operation. When the operation start is instructed in the state where the rotating operation of the first operating member (aperture ring 40) is prevented by the operation of the second operating member (aperture mode switching button 43), the control means generates the control signal for changing the aperture of the aperture stop based on an operation result of the operation means (microcomputer 49).

In the imaging device TL in accordance with the embodiment of the present invention, since the aperture ring 40 and the aperture stop 22 are not mechanically connected, when it is the shutter speed priority mode where the aforementioned control is performed by the microcomputer 49, the aperture ring 40 does not rotate. Thus, it is possible to provide the imaging device excellent in operability for the user.

Moreover, in the imaging device TL in accordance with the embodiment of the present invention, the ring unit 25 is attachable and detachable in the state where the imaging optical system of the lens unit 2 can form the optical image of the object. Thus, it is possible to evaluate the imaging optical system even before the ring unit is attached. Moreover, even if the ring unit is damaged or deteriorated, the ring units can be exchanged without decomposing the imaging optical system.

In the digital camera 1 in accordance with the embodiment of the present invention, the filter mount 29 is attachable and detachable in the state where the imaging optical system of the lens unit 2 can form the optical image of the object. Thus, even if the filter mount is damaged or deteriorated, the filter mount can be exchanged without decomposing the imaging optical system.

Moreover, the assembly method of the lens barrel 46 in accordance with the embodiment of the present invention is provided with following steps, that is (1) a first step of assembling the lens unit which holds the imaging optical system L for forming the optical image of the object, (2) a second step of assembling the ring unit 25 which is of a cylindrical shape coaxial to the optical axis of the imaging optical system and includes an operating member which is manually operated in a rotational manner, and (3) a third step of attaching the ring unit 25 to the completed lens unit 2.

According to the assembly method of the lens barrel 46 in accordance with the embodiment of the present invention, it is possible to evaluate the imaging optical system even before the ring unit is attached Moreover, the assembly method of the lens barrel 46 in accordance with the embodiment of the present invention is provided with following steps.

a first step of assembling the lens unit 2 which holds the imaging optical system L for forming the optical image of the object, and a second step for attaching the filter mount 29 to be fixed to the side closest to the object of the lens unit 2 to the completed lens unit 2 in order to hold the filter or other optical system which should be arranged on the side closest to the object of the imaging optical system.

According to the assembly method of the lens barrel 46 in accordance with the embodiment of the present invention, it is possible to evaluate the imaging optical system even before the ring unit is attached. Moreover, even if the filter mount is damaged or deteriorated, the filter mount can be exchanged without decomposing the imaging optical system.

It should be noted herein that the aforementioned embodiment of the present invention is not limited to a specific aspect in its contents, but could be changed suitably.

For example, while the linear sensor with slider is used in detecting an absolute angle of the focus ring 32 and the aperture ring 40 in the present embodiment, a linear sensor with contact brush and conductive pattern may also be employed.

Figure 18:
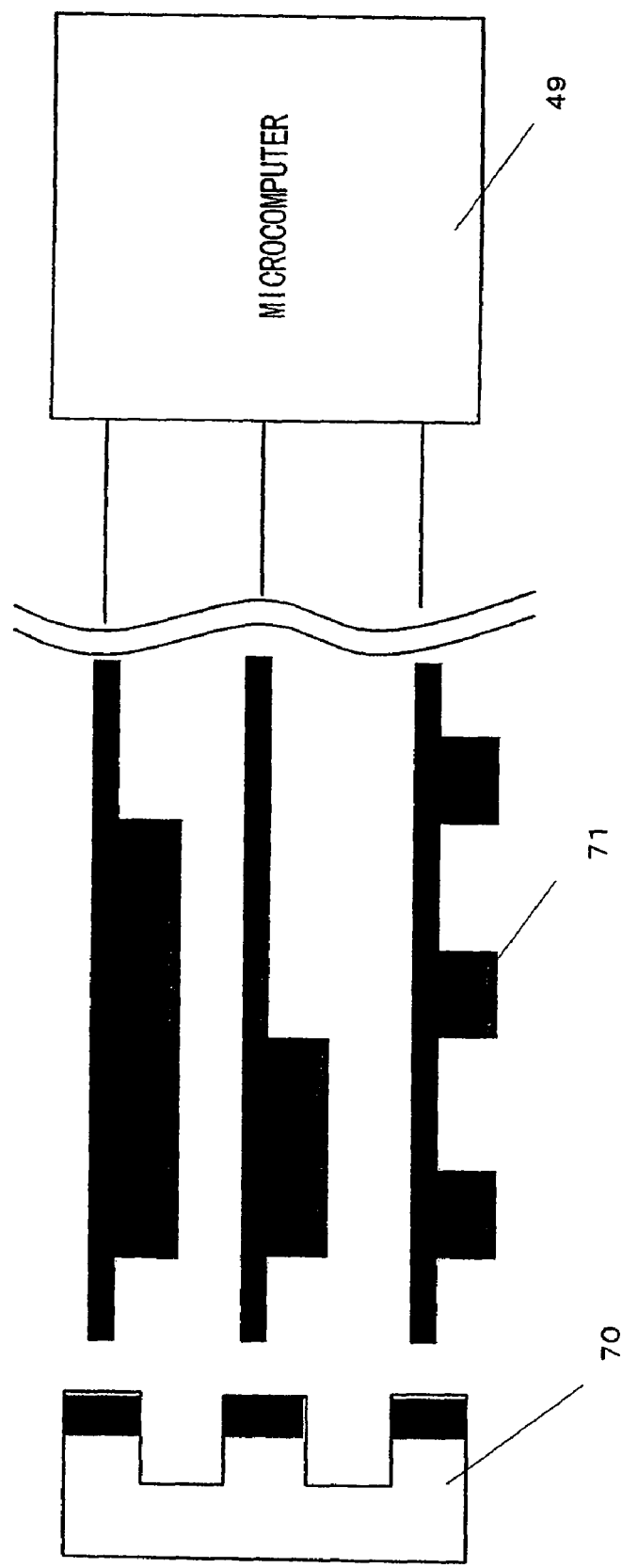
FIG. 18 is a schematic diagram illustrating a conductive pattern of the focus linear sensor according to a modification of the embodiment of the present invention.

FIG. 18 is a schematic diagram illustrating a conductive pattern of the linear sensor according to a modification of the embodiment of the present invention. The linear sensor shown in FIG. 18 includes a contact brush 70 and a conductive pattern 71. In the linear sensor shown in FIG. 18, moving the contact brush 70 on the conductive pattern 71 will vary a contact area between the contact brush 70 and the conductive pattern 71. At this time, when a voltage is applied to the contact brush, a voltage outputted from the conductive pattern 71 will be changed. Thus, a position of the contact brush 70 can be detected.

When the linear sensor shown in FIG. 18 is replaced by the focus linear sensor 35 of the embodiment, what is necessary is to provide the contact brush 70 in the inner periphery of the focus ring 32, and just to fix the conductive pattern 71 to the outer periphery of the third ring fixing frame 36. When the linear sensor shown in FIG. 18 is replaced by the aperture linear sensor 41 of the embodiment, what is necessary is to provide the contact brush 70 in the inner periphery of the aperture ring 40, and just to fix the conductive pattern 71 to the outer periphery of the third ring fixing frame 36. In addition, a rotary encoder for detecting the amount of rotation may be used instead of the linear sensor.

Moreover, in switching between the auto and manual modes of the focus and the aperture, the ring is rotated while pushing the switching button in shifting to either modes in the present embodiment, but it is not limited to this configuration.

FIG. 19 is a schematic sectional view for explaining actions of the focus mode switching button 37 according to the modification of the embodiment of the present invention. The direction shown by the arrowhead K in the figures represents the rotational direction around the optical axis AX. In the focus ring 32, the first stop position corresponds to the position of the character [∞] shown in FIG. 9A. Additionally, in the focus ring 32, the second stop position corresponds to the position of the character [AF] shown in FIG. 9A. A focus mode switching button of the modification roughly has the same configuration as that of the focus mode switching button 37 of the embodiment. Meanwhile, a shape of a locking part 38a' provided in the second ring fixing frame 38 of the modification is not the same as the shape of the locking part 38a provided in the second ring fixing frame 38 of the embodiment.

The locking part 38a of the modification has a slanting surface on one side (refer to FIG. 19C). For this reason, in rotating in a reverse direction to the K direction from the second stop position (state of FIG. 19C), since the locking part 37a of the focus mode switching button 37 is movable along the slanting surface of locking part 38a', the locking part 38a' does not serve as a locking part. At this time, according to the modification, when rotationally operated from the manual-normal shooting area to the auto-normal shooting area, the focus ring 32 cannot be rotationally operated, unless it is rotated while pushing the focus mode switching button 37 as described in the embodiment. When rotationally operated from the auto-normal shooting area to the manual-normal shooting area, however, unlike the operation described in the embodiment, it is possible to rotate the focus ring 32 even when the focus mode switching button 37 is not pushed. When shifting from the auto-normal shooting area to the manual shooting area, the user may desire an instant switching. In such a case, employing the configuration according to the modification may omit the operation of the focus mode switching button 37.

Moreover, while the digital camera that mounts three rings, namely, the zoom ring, the focus ring, and the aperture ring is described in the embodiment, it is needless to say that the present invention is adaptable for the digital camera that mounts only two rings, namely, the zoom ring and the focus ring. Moreover, an order of arranging the rings is not limited to the order described in the present embodiment, either.

Moreover, while the example in which the zoom ring is manually operated in a rotational manner is described in the embodiment, it may also be a power zoom lens driven by a motor by applying a configuration similar to that of the focus ring of the embodiment to the zoom ring.

Moreover, while the example in which the auto focus operation is performed based on the image signal outputted by the image sensor is described in the embodiment, it is not limited to this. A passive type detection sensor with a phase difference detection system provided independently of the image sensor, and an active type detection sensor which measures a distance using a light emitting device and a light receiving device provided independently of the image sensor may also be used.

Moreover, while the shutter is the so-called lens shutter arranged in the imaging optical system in the embodiment, a focal plane shutter arranged near the image sensor may also be used.

Moreover, the imaging optical system may be suitably changed depending on specifications or purposes. For example, it is not limited to the imaging optical system described in the present embodiment, in which a total length thereof is fixed, but an imaging optical system with total length adjustable system, in which the total length thereof is adjustable depending on a zoom magnification, may also be adapted.

INDUSTRIAL APPLICABILITY

The present invention can provide the digital camera excellent in operability, in which a reduction in parts is achieved. Moreover, applying the lens barrel and the imaging device according to the present invention to mobile devices, such as a portable telephone terminal and a PDA (Personal Digital Assist) makes it possible to incorporate, into these devices, the digital camera excellent in operability in which a reduction in parts is achieved.

The invention claimed is:

1. A lens barrel, comprising:
a lens unit for holding an imaging optical system, the imaging optical system forming an optical image of an object and including a focus lens unit which moves in a direction parallel to an optical axis at the time of focusing;
a focus ring unit including a cylindrical focus ring and a cylindrical ring fixing frame which supports the focus ring in a rotatable manner, the focus ring being manually operated to move the focus lens unit, wherein
the focus ring unit is detachably coupled to the lens unit from an optical image side in a state where the imaging optical system in the lens unit is capable of forming the optical image of the object.

2. The lens barrel according to claim 1, further comprising a filter mount capable of disposing a filter or other optical system at an object side of the imaging optical system, wherein
the filter mount is detachably coupled to the lens unit from the object side in a state where the imaging optical system in the lens unit is capable of forming the optical image of the object.

3. The lens barrel according to claim 1, wherein the focus ring unit is detachably coupled to the lens unit in such a way that the lens unit is inserted inside the focus ring and the ring fixing frame.

4. The lens barrel of claim 1, wherein the lens unit includes all lenses of the image optical system and a lens fixing frame that holds at least one lens.

5. The lens barrel according to claim 2, wherein the filter mount is coupled to the lens unit with a screw which is screwed from the object side in a direction parallel to the optical axis.

6. A lens barrel, comprising:
a lens unit for holding an imaging optical system, the imaging optical system forming an optical image of an object and including a zoom lens unit which moves in a direction parallel to an optical axis at the time of zooming;
a zoom ring unit including a cylindrical zoom ring and a cylindrical first ring fixing frame which supports the zoom ring in a rotatable manner, the zoom ring being manually operated to move the zoom lens unit, wherein
the zoom ring unit is detachably coupled to the lens unit from an optical image side in a state where the imaging optical system in the lens unit is capable of forming the optical image of the object.

7. The lens barrel according to claim 6, wherein the imaging optical system includes a focus lens unit which moves in a direction parallel to an optical axis at the time of focusing.

8. The lens barrel according to claim 6, wherein the zoom unit is detachably coupled to the lens unit in such a way that the lens unit is inserted inside the zoom ring and the first ring fixing frame.

9. The lens barrel of claim 6, wherein the lens unit includes all lenses of the mage optical system and a lens fixing frame that holds at least one lens.

10. The lens barrel according to claim 7, further comprising
a focus ring unit including a cylindrical focus ring and a cylindrical second ring fixing frame which supports the focus ring in a rotatable manner, the focus ring being manually operated to move the focus lens unit, wherein
the focus ring unit is detachably coupled to the lens unit from the optical image side in a state where the imaging optical system in the lens unit is capable of forming the optical image of the object.

11. The lens barrel according to claim 10, wherein the focus ring unit is detachably coupled to the lens unit in such a way that the lens unit is inserted inside the focus ring and the second ring fixing frame.

12. A lens barrel, comprising:
a lens unit for holding an imaging optical system, the imaging optical system forming an optical image of an object and including a focus lens unit which moves in a direction parallel to an optical axis at the time of focusing and a zoom lens unit which moves in a direction parallel to the optical axis at the time of zooming;
a ring unit including a cylindrical focus ring, a cylindrical zoom ring, and a cylindrical ring fixing frame which supports the focus ring and the zoom ring in a rotatable manner, the focus ring and the zoom ring being manually operated to move the focus lens unit and the zoom lens unit, respectively, wherein
the ring unit is detachably coupled to the lens unit from an optical image side in a state where the imaging optical system in the lens unit is capable of forming the optical image of the object.

13. The lens barrel according to claim 12, wherein the ring unit is detachably coupled to the lens unit in such a way that the lens unit is inserted inside the focus ring, the zoom ring, and the ring fixing frame.

14. The lens barrel of claim 12, wherein the lens unit includes all lenses of the image optical system and a lens fixing frame that holds at least one lens.

* * * * *